(12) United States Patent
De Munck et al.

(10) Patent No.: US 9,649,857 B2
(45) Date of Patent: May 16, 2017

(54) LABEL PRINTER

(71) Applicant: DYMO, Sint-Niklaas (BE)

(72) Inventors: Elke De Munck, Dendermonde (BE); Jimmy Dullaert, Stekene (BE); Jos Vleurinck, Oordegem (BE); Lore Nuyens, Mechelen (BE)

(73) Assignee: DYMO, Sint-Niklaas (BE)

( * ) Notice: Subject to any disclaimer, the term of this patent is extended or adjusted under 35 U.S.C. 154(b) by 0 days.

(21) Appl. No.: 14/583,852

(22) Filed: Dec. 29, 2014

(65) Prior Publication Data

US 2015/0239260 A1  Aug. 27, 2015

Related U.S. Application Data

(63) Continuation of application No. 13/121,159, filed as application No. PCT/EP2009/062563 on Sep. 28, 2009, now Pat. No. 8,947,722.

(30) Foreign Application Priority Data

Sep. 26, 2008 (GB) .................................. 0817702.4

(51) Int. Cl.
*B41J 3/407* (2006.01)
*G06F 3/041* (2006.01)
*H04N 1/00* (2006.01)

(52) U.S. Cl.
CPC ............ *B41J 3/4075* (2013.01); *G06F 3/041* (2013.01); *H04N 1/00392* (2013.01)

(58) Field of Classification Search
CPC .... B41J 3/4075; H04N 1/00392; G06F 3/041; G06F 3/0421; G06F 17/211; G06F 17/214
See application file for complete search history.

(56) References Cited

U.S. PATENT DOCUMENTS 4,815,871 A  3/1989  McGourty et al.
4,927,278 A  5/1990  Kuzuya et al.
(Continued)

FOREIGN PATENT DOCUMENTS

EP  0 267 890 A2  5/1988
EP  0 322 918 A2  7/1989
(Continued)

OTHER PUBLICATIONS

International Search Report for PCT/EP2009/062563, mailed Mar. 19, 2010 (10 pages).
(Continued)

*Primary Examiner* — Justin Seo
(74) *Attorney, Agent, or Firm* — Marshall, Gerstein & Borun LLP

(57) ABSTRACT

A label printer has a touchscreen for displaying and inputting label data, and comprising at least one input area. The label printer also has a hardware keyboard for inputting label data, and comprising at least one hardware key. The label printer also has control means arranged to control printing means for printing a label in accordance with label information. The label information is derived from a combination of label data input via the at least one hardware key of said hardware keyboard and label data input via the at least one input area of said touchscreen.

30 Claims, 25 Drawing Sheets

(56) References Cited

U.S. PATENT DOCUMENTS

| | | | |
|---|---|---|---|
| 4,966,476 A | 10/1990 | Kuzuya et al. | |
| 5,243,174 A | 9/1993 | Veeneman et al. | |
| 5,458,423 A | 10/1995 | Sims et al. | |
| 5,480,246 A | 1/1996 | Morimoto | |
| 5,487,010 A | 1/1996 | Drake et al. | |
| 5,510,979 A | 4/1996 | Moderi et al. | |
| 5,623,581 A | 4/1997 | Attenberg | |
| 5,737,504 A | 4/1998 | Yamada | |
| 5,745,716 A * | 4/1998 | Tchao | G06F 3/0483 715/777 |
| 6,243,701 B1 | 6/2001 | Shih et al. | |
| 6,271,835 B1 | 8/2001 | Hoeksma | |
| 6,327,576 B1 | 12/2001 | Ogasawara | |
| 6,607,316 B1 | 8/2003 | Petteruti et al. | |
| 6,915,273 B1 | 7/2005 | Parulski | |
| 7,194,957 B1 | 3/2007 | Leon et al. | |
| 7,479,949 B2 | 1/2009 | Jobs et al. | |
| RE42,268 E | 4/2011 | Hawkins et al. | |
| 8,363,247 B2 | 1/2013 | Butcher | |
| 2001/0024590 A1 | 9/2001 | Woodman et al. | |
| 2001/0042262 A1 | 11/2001 | Chu | |
| 2002/0190956 A1 | 12/2002 | Klein et al. | |
| 2003/0014239 A1 | 1/2003 | Ichbiah et al. | |
| 2003/0103232 A1 | 6/2003 | Twede | |
| 2003/0171986 A1 | 9/2003 | Itkis et al. | |
| 2003/0180081 A1 | 9/2003 | Woodman | |
| 2003/0218634 A1 | 11/2003 | Kuchinsky et al. | |
| 2004/0090642 A1 | 5/2004 | Hikita | |
| 2004/0211600 A1 | 10/2004 | Schuller et al. | |
| 2005/0038758 A1 | 2/2005 | Hilbush et al. | |
| 2005/0058485 A1 | 3/2005 | Horii et al. | |
| 2005/0105948 A1 | 5/2005 | Woodman | |
| 2005/0117949 A1 | 6/2005 | Waldal | |
| 2006/0080173 A1 | 4/2006 | Robinson et al. | |
| 2006/0093422 A1 | 5/2006 | Van Britsom et al. | |
| 2006/0114487 A1 | 6/2006 | Caveney et al. | |
| 2006/0161858 A1 | 7/2006 | Hawkins et al. | |
| 2006/0229557 A1 * | 10/2006 | Fathallah | G06F 19/3406 604/131 |
| 2007/0028182 A1 | 2/2007 | Kong | |
| 2007/0035524 A1 | 2/2007 | Hyatt | |
| 2008/0048986 A1 | 2/2008 | Khoo | |
| 2008/0080918 A1 | 4/2008 | Caveney et al. | |
| 2008/0085142 A1 | 4/2008 | Caveney et al. | |
| 2008/0112005 A1 | 5/2008 | Murray et al. | |
| 2008/0182639 A1 | 7/2008 | Antonopoulos et al. | |
| 2008/0218486 A1 | 9/2008 | Haseyama et al. | |
| 2008/0231610 A1 | 9/2008 | Hotelling et al. | |
| 2008/0255870 A1 | 10/2008 | Butler | |
| 2009/0006998 A1 | 1/2009 | Neeleman et al. | |
| 2009/0157432 A1 * | 6/2009 | Palmroos | A61M 5/142 705/3 |
| 2009/0190987 A1 | 7/2009 | Vleurinck et al. | |
| 2009/0212925 A1 * | 8/2009 | Schuman, Sr. | G08B 5/222 340/286.07 |
| 2009/0287992 A1 * | 11/2009 | Bresolin | G06Q 10/06 715/226 |
| 2010/0303946 A1 | 12/2010 | Voth | |
| 2011/0286012 A1 | 11/2011 | De Munck et al. | |
| 2012/0254786 A1 | 10/2012 | Colley | |

FOREIGN PATENT DOCUMENTS

| | | |
|---|---|---|
| EP | 0 322 919 A2 | 7/1989 |
| EP | 0 578 372 A2 | 1/1994 |
| EP | 1440809 | 7/2004 |
| EP | 1804173 A1 | 7/2007 |
| GB | 2296805 A | 7/1996 |
| JP | 05-204919 B1 | 8/1993 |
| JP | 06-106784 | 4/1994 |
| JP | H08118742 A | 5/1996 |
| JP | 10264452 A | 10/1998 |
| JP | 10337913 | 12/1998 |
| JP | 2000190575 | 7/2000 |
| JP | 2000355313 | 12/2000 |
| JP | 2002082933 | 3/2002 |
| JP | 2002144671 | 5/2002 |
| JP | 2004-330425 | 11/2004 |
| JP | 2005284631 | 10/2005 |
| JP | 2007/128218 A | 5/2007 |
| JP | 2007-531081 | 11/2007 |
| JP | 2007316690 | 12/2007 |
| JP | 05204919 B1 | 6/2013 |
| WO | WO-03/034329 A1 | 4/2003 |
| WO | WO-2005-008899 | 1/2005 |
| WO | WO-2007/144763 A2 | 12/2007 |

OTHER PUBLICATIONS

Written Opinion for PCT/EP2009/062563, mailed Mar. 19, 2010 (14 pages).
Notification of the Second Office Action, The State Intellectual Property Office of the People's Republic of China, Application No. 200980145826.4 dated Dec. 26, 2013.
Office Action in JP Application No. 2011-528360 dated Dec. 10, 2013.
Ishida, SR-2000a Touch Screen Scale and Printed Quick Setup Instructions, Sep. 2006, Rev. 1.
Extended European Search Report in EP Application No. 14190224.7 dated Jan. 5, 2017, 8 pages.
Dennison Avery, "Operator's Handbook" Monarch® 9415™ Food Freshness System, Jan. 1, 2007, 62 pages, http://www.monarch.averydennison.com/mcdonalds/docs/9415mcdoh_ah.pdf, retrieved from the internet on Dec. 20, 2016.
Great Britain Search Report for Application No. GB0817702.4, dated Jul. 15, 2019.

* cited by examiner

LABEL PRINTER

REFERENCE TO RELATED APPLICATIONS

This is a continuation of U.S. application Ser. No. 13/121,159 filed Jul. 7, 2011, which is the US national phase under 35 USC §371 of International Patent Application No. PCT/EP2009/062563 having an international filing date of Sep. 28, 2009, and claiming priority to United Kingdom GB 0817702.4 filed Sep. 26, 2008.

FIELD OF THE DISCLOSURE

The present invention relates to a printing device and in particular to a stand-alone label printer for printing an image on a label.

DESCRIPTION OF THE RELATED ART

Known tape printing apparatus are disclosed in EP-A-322918 and EP-A-322919 (Brother Kogyo Kabushiki Kaisha) and EP-A-267890 (Varitronic). The printers each include a cassette receiving bay for receiving a cassette or tape holding case. In EP-A-267890, the tape holding case houses an ink ribbon and a substrate tape, the latter comprising an upper image receiving layer secured to a backing layer by an adhesive. In EP-A-322918 and EP-A-322919, the tape holding case houses an ink ribbon, a transparent image receiving tape and a double sided adhesive tape which is secured at one of its adhesive coated sides to the image tape after printing and which has a backing layer peelable from its other adhesive coated side. With both these apparatus, the image transfer medium (ink ribbon) and the image receiving tape (substrate) are in the same cassette.

It has also been proposed by the present applicants in, for example, EP-A-578372 to house the ink ribbon and the substrate tape in separate cassettes.

In all of these cases, the image receiving tape passes in overlap with the ink ribbon to a print zone consisting of a fixed print head and a platen against which the print head can be pressed to cause an image to transfer from the ink ribbon to the image receiving tape. There are many ways of doing this, including dry lettering or dry film impression, but the most usual way currently is by thermal printing where the print head is heated and the heat causes ink from the ink ribbon to be transferred to the image receiving tape.

In other known tape printing apparatuses, so-called direct thermal tapes are used, in which an image is created directly onto the direct thermal tape without the interposition of an ink ribbon cassette. Elements of a print head are heated, and the heat causes chemicals within the direct thermal tape to react and produce an image in or on the tape.

The devices of the type described above are provided with a keyboard which enables a user to enter characters, symbols and the like to form an image to be printed by the tape printer. The keyboard usually has text character keys and number keys for entering letters and numbers respectively, plus some function keys which, among other things, operate menus and allow printing attributes to be set.

For a printer to be used with the English language, a maximum of 26 text character keys are required, one for each letter of the alphabet. However, if the printer is to be used with other European languages, keys which allow accented characters to be printed must be provided. For example, in the French language, "é" and "è" are required in addition to the ordinary "e". In some European languages, a significant number of accented characters are required. This results in at least two problems.

Firstly, many machines are provided with additional text character keys to the standard 26 within the keyboard so as to enable the user to easily select the accented characters. This results in more space being taken up on the keyboard with text character keys, which means either a larger keyboard is required, which may not be convenient, particularly for a compact hand-held machine, and/or less space is available on the keyboard for function keys, which means that more keystrokes may be required to execute certain functions. Alternatively the printer may be provided with keys which represent a plurality of characters/symbols whereby the user may need to use a large number of keystrokes to access menus to enable selection of the required character, which is time consuming and complicated for the user.

Similar problems exist with other languages where there are a large number of characters such as Chinese or Japanese.

Another problem is that different keyboard layouts are used in different countries which may increase the number of different printers which need to be provided. This can lead to an increased manufacturing cost.

The keyboards of known devices often include keys which are operable to select a portion of label data for printing onto a medium, and to alter the printing position relative to the medium at which the portion of label data is to be printed.

In such devices, the user may need to use a large number of keystrokes to select the portion of label data, and a further large number of keystrokes to alter the printing position.

Often a display is provided in known devices, which display presents to the user one or more selectable options. If the options are presented in a list, a large number of keystrokes may be required to move up/down the list until the desired option is found. If the options are presented at various positions within the display, it may be confusing and thus time consuming for the user to determine which key on a keyboard of the device he/she has to press to select the desired option.

"Stand-alone" label printers can be distinguished from "label printer systems", which comprise a printer connected to a PC or other computing device. In such label printer systems, a user creates or edits a label for printing using a PC, and then sends print data to a printer to cause the printer to print the print data onto a label medium. In such label printer systems, the user will view a display of the PC to create a label, rather than a display of the printer. Also, the label-editing software used for creating the label will be stored and run on the PC, rather than the printer.

In contrast, stand-alone label printers are operable independently of a PC or other computer to create and print a label. Although some stand-alone printers are connectable to a PC or other computer to receive some data, they are nevertheless operable independently of the PC or other computer to create a label for printing, since label-editing software used for creating the label is stored and run on the label printer itself. Stand-alone label printers thus usually include an integral display via which the user can view an interface of the label-editing software.

SUMMARY OF THE DISCLOSURE

A first aspect of the present invention may provide a label printer having a touchscreen for displaying and inputting label data, and comprising at least one input area; a hardware keyboard for inputting label data, and comprising at least one hardware key; and control means arranged to control printing means for printing a label in accordance with label information; wherein the label information is derived from a combination of label data input via the key of said hardware keyboard and label data input via the at least one input area of said touchscreen.

The label information may comprise information defining a character. The character may comprise an accented character. The label information may comprise information defining a symbol. The label information may comprise information defining a format.

The control means may be arranged to initiate a data input mode, when a user provides an input to the touchscreen by touching a point within a portion of the touchscreen that is capable of displaying data. The hardware keyboard may comprise a hardware key associated with an item of data. The control means may be arranged to control said touchscreen to display said item of data at said point within the portion, when the user subsequently presses said hardware key.

The portion of the touchscreen may be a portion capable of displaying a representation of at least part of a label to be printed. The label printer may have print means for printing said item of data onto a label.

Optionally, when the control means initiates the data input mode, the control means is arranged to control said touchscreen to display to the user a prompt to enter data. The prompt may comprise a cursor, such as a blinking cursor, displayed at said point within said portion of the touchscreen.

A second aspect of the present invention may provide a label printer having a touchscreen for receiving an input from a user, a portion of the touchscreen being capable of displaying data; a hardware keyboard for inputting data, said hardware keyboard comprising a hardware key associated with an item of data; and control means; wherein the control means is arranged to initiate a data input mode, when the user provides an input to the touchscreen by touching a point within said portion, and the control means is arranged to control said touchscreen to display said item of data at said point within the portion, when the user subsequently presses said hardware key.

The portion of the touchscreen may be a portion capable of displaying a representation of at least part of a label to be printed. The label printer may further have print means for printing said item of data onto a label.

Optionally, when the control means initiates the data input mode, the control means is arranged to control said touchscreen to display to the user a prompt to enter data. The prompt may comprise a cursor displayed at said point within said portion of the touchscreen. The cursor may be a blinking cursor.

A third aspect of the present invention may provide a method of printing a label, comprising inputting label data via at least one hardware key of a hardware keyboard of a label printer; inputting label data via at least one input area of a touchscreen of the label printer; and printing the label in accordance with label information, wherein the label information is derived from the combination of the label data input via the at least one hardware key of said hardware keyboard and the label data input via the at least one input area of said touchscreen.

The method may comprise initiating a data input mode in dependence on receiving an input from a user at a point within a portion of the touchscreen of the label printer that is capable of displaying data. The method may comprise receiving a signal from a hardware key of the keyboard of the label printer, the hardware key being associated with an item of data. The method may comprise displaying said item of data at said point within the portion of the touchscreen.

A fourth aspect of the present invention may provide a method of operating a display of a label printer, comprising initiating a data input mode in dependence on receiving an input from a user at a point within a portion of a touchscreen of the label printer; receiving a signal from a hardware key of a keyboard of the label printer, the hardware key being associated with an item of data; and displaying said item of data at said point within the portion of the touchscreen.

Optionally, initiating the data input mode includes displaying on the touchscreen a prompt to the user to enter data.

A fifth aspect of the present invention may provide a label printer having memory configured to store data defining plural different graphical control panel layouts, each of said layouts comprising an arrangement of input areas of a respective graphical control panel; means for selecting one of said graphical control panel layouts; and a touchscreen configured to display a graphical control panel with input areas arranged on the display in accordance with the selected graphical control panel layout.

The means for selecting one of said graphical control panel layouts may comprise a section of the touchscreen that is configured to send a signal to control means, when a user touches the section of the touchscreen.

The section of the touchscreen may include plural areas, each of which is associated with one of said graphical control panel layouts. The touchscreen may be configured to display the graphical control panel layout associated with one of the areas, when the user touches that area.

At least one of the layouts may comprise an arrangement of input areas corresponding to respective different letters of the alphabet. At least one of the layouts may comprise an arrangement of input areas corresponding to accented letters of the alphabet, punctuation marks, currency symbols, numbers, or graphic symbols.

At least one of the layouts may comprise a data layout input area. The label printer may be configured such that, when a part of the display at which the data layout input area is displayed is touched by a user, the layout of label data to be printed onto a medium is changed. The layout may be changed by adding a border to the label data, by changing the font, style or size of text included in the label data, by changing the position of text or an image included in the label data, or by applying a template to the label data.

At least one of the layouts may comprise a data field input area. The label printer may be configured such that, when a part of the display at which the data field input area is displayed is touched by a user, a data field to which text or images are addable to create label data for printing onto a medium is displayed on the display.

The touchscreen may be configured to display a representation of label data to be printed onto a medium. The touchscreen may be configured to display a representation of label data to be printed onto the medium as a first label and label data to be printed onto the medium as a second label.

The touchscreen may be configured to display a representation of a position at which the medium is to be cut by cutting means of the label printer.

The label printer may be configured such that, when a part of the display at which one of the data input areas is displayed is touched by a user, the representation of label data is changed. The touchscreen may be configured to display the representation of label data adjacent to the data input areas.

A sixth aspect of the present invention may provide a label printer having control means and a touchscreen, wherein the touchscreen includes a first screen section configured to display a representation of label data to be printed onto a medium; and a second screen section comprising an input section configured to send a signal to the control means when a user touches a part of the second screen section.

The first screen section of the touchscreen may be configured to display a representation of the label data with a modified attribute, in dependence on the control means receiving the signal. An attribute of the label data to be printed onto the medium may be changed in dependence on the control means receiving the signal. The attribute may comprise one of font type, font style, font size, text alignment and text direction.

The control means may be configured to control a print head of the label printer to print the label data onto the medium, in dependence on the control means receiving the signal.

The first screen section may be configured to display a label template, in dependence on the control means receiving the signal.

The first screen section may be configured to display a representation of a position at which the medium is to be cut by cutting means of the label printer, in dependence on the control means receiving the signal.

The first screen section may be configured to display a representation of label data to be printed onto the medium as a first label and label data to be printed onto the medium as a second label.

The first screen section may be configured to display a data field to which text or images are addable to create the label data for printing onto the medium, in dependence on the control means receiving the signal.

The first screen section may be configured to send a second signal to the control means when a user touches a part of the first screen section. The first screen section may be configured to display a cursor at said part of the first screen section, in dependence on the control means receiving the second signal.

The signal may be sent to the control means when the user strokes the part of the input section.

The input section may be configured to send a different signal to the control means when the user touches a different part of the input section.

A seventh aspect of the present invention may provide a label printer having memory configured to store a list of plural data entries; control means; and a touchscreen; wherein the touchscreen includes a first screen section configured to display information associated with a first set of the plural data entries, and a second screen section configured to send a signal to the control means when a user touches a part of the second screen section; and wherein the control means is configured to control the first screen section of the touchscreen to display information associated with a second set of the plural data entries, in dependence on the control means receiving the signal.

The second screen section of the touchscreen may be configured to send the signal to the control means when the user strokes the part of the second screen section.

The signal sent to the control means may be representative of the speed at which the user strokes the part of the second screen section.

The control means may be configured to control the first screen section of the touchscreen to display information associated with a second set of plural data entries relatively close to the first set of plural data entries in the list, when the signal is representative of a stroke with a speed above a threshold. The control means may be configured to control the first screen section of the touchscreen to display information associated with a second set of plural data entries relatively distant from the first set of plural data entries in the list, when the signal is representative of a stroke with a speed at or below the threshold.

The control means may be configured to control the first screen section of the touchscreen to display information associated with a second set of plural data entries relatively close to the first set of plural data entries in the list, when the signal is representative of a stroke with a speed below a threshold. The control means may be configured to control the first screen section of the touchscreen to display information associated with a second set of plural data entries relatively distant from the first set of plural data entries in the list, when the signal is representative of a stroke with a speed at or above the threshold.

The list of plural data entries may comprise a list of one of: label templates, font types for text to be included in label data for printing onto a medium, label border styles to be printed onto a medium, and label data to be printed onto a medium. The list of plural data entries may comprise a list of file names.

The touchscreen may include a third screen section which is configured to display label data to be printed onto a medium that is associated with one of the plural data entries, when the user touches a part of the first screen section of the touchscreen. The part of the first screen section may be a part at which information associated with said one of the plural data entries is displayed.

The touchscreen may include a fourth screen section which is configured to display label data to be printed onto a medium.

One of the plural data entries may be additional label data to be printed onto the medium. The fourth screen section may be configured to display the additional label data, when the user touches a part of the first screen section that displays information associated with said one of the plural data entries.

An eighth aspect of the present invention may provide a label printer having control means; and a touchscreen configured to display, at a first position within a screen section, a representation of a label data field to be printed onto a medium; wherein the control means is configured to control the touchscreen to display the representation of the label data field at a second position within the screen section, when a user touches a part of the touchscreen and maintains contact with the touchscreen until releasing contact with the touchscreen at a different part of the touchscreen.

The touchscreen may be configured to display information representative of the width of a label to be printed. The information representative of the width of the label may be changed, when the touchscreen displays the representation of the label data field at the second position within the screen section.

The touchscreen may be configured to display, at a third position within the screen section, a representation of a second label data field to be printed onto the medium. The touchscreen may be configured to display the representation of the second label data field at a fourth position within the screen section, when the touchscreen displays the representation of the label data field at the second position within the screen section.

A ninth aspect of the present invention may provide a label printer having input means for inputting label data to be printed; a screen for displaying the label data; control means connected to the input means and to the screen and arranged to control printing means for printing a label in accordance with the label data; and a home button which, when operated by a user, causes a home screen to be displayed on the screen.

The control means is preferably arranged to cause the home screen to be displayed whenever the home button is operated.

The home screen may comprise at least one of: an area selectable by the user to start making a new label; an area selectable by the user to view an open file screen, via which open file screen the user is able to select a label file to open in order to recall saved data from memory; an area selectable by the user to edit label data shown on the home screen; an area selectable by the user when they want to save label data to memory; and an area selectable by the user to initiate altering device settings.

The home screen is preferably displayed when the label printer is switched on, or shortly thereafter.

The screen of the ninth aspect of the present invention is preferably comprised in a touchscreen, but may alternatively comprise a screen that is not comprised in a touchscreen. Where the screen is comprised in a touchscreen, the input means may comprise portions of a touch panel of the touchscreen that are selectable by being touched by a user. Thus, a touchscreen may comprise the input means for inputting the label data. Alternatively or additionally, and whether or not the screen is comprised in a touchscreen, the input means may comprise a hardware keyboard with a series of hardware keys.

BRIEF DESCRIPTION OF THE SEVERAL VIEWS OF THE DRAWING

Reference will now be made by way of example to the accompanying drawings in which.

DETAILED DESCRIPTION OF THE PREFERRED EMBODIMENTS

Figure 1:
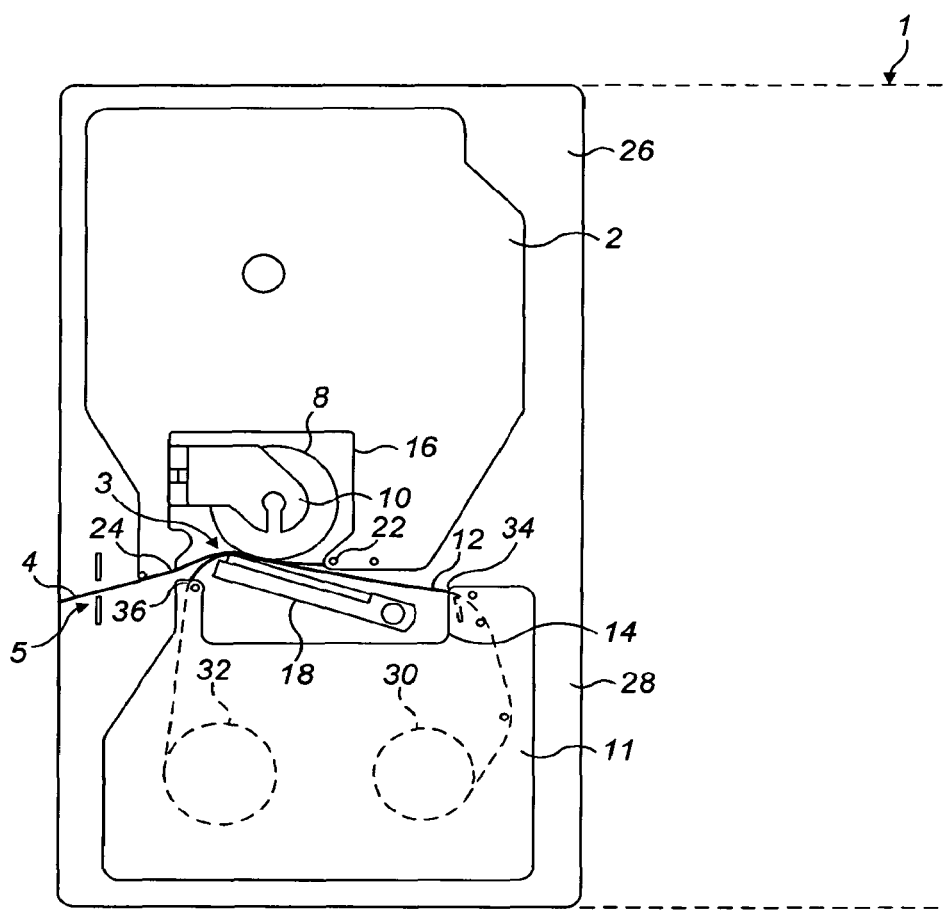
FIG. 1 is a plan view of a first label printing device using a two cassette set system.

Some embodiments may provide a printer which enables a user to access accented characters in a number of languages using a small number of straightforward steps.

Some embodiments may be such that one printer can be provided for a number of different countries, with the software modifying the function of the printer appropriately. This may lead to decreased manufacturing costs. Additionally or alternatively, it may be viable to provide printers for specific language or countries where volumes may be relatively low without having to significantly increase production costs.

Some embodiments of the invention may provide a simpler interface for languages such as Chinese and Japanese having a larger character set.

Some embodiments may provide a printer which enables the user to access a plurality of characters, symbols and functions using a simple and straightforward input method.

Some embodiments may provide a printer with a flexible, ergonomic and simple system by which a user is able to alter the printing position relative to a medium of label data.

Some embodiments may provide a printer with a simple and straightforward system by which a user can navigate quickly to a desired option.

Label printers that embody the present invention are "standalone" label printers, as they are operable by a user independently of a PC or other computer to create and print a label. Although some embodiments of the stand-alone label printer of the present invention are connectable to a PC or other computer or device to receive e.g. software upgrades, label templates, print data, etc., they are nevertheless operable by a user without being so connected to edit or create a label for printing, since the label-editing software used for creating the label is stored and run on the label printer itself.

The stand-alone label printer may comprise a display formed integrally with the label printer, via which display the user can view an interface of the label-editing software to create or edit a label. The stand-alone label printer may also comprise a series of input keys, which can be software keys displayed on the integral display and operable by a user touching a touchscreen overlying the display, and/or hardware keys integral with the label printer. Such a touchscreen is preferably integrally formed with the body of the label printer, such that the touchscreen is not a separate device connected wirelessly or with wires to the label printer. Thus, data defining a label to be printed can be created and/or manipulated in the stand-alone label printer itself, based on inputs made by the user via the input keys, and the data need not be sent to the label printer from a PC or other computer or other device connected wirelessly or with wires to the label printer.

Some embodiments of the present invention may comprise a portable or handheld stand-alone label printer. Other embodiments may comprise a larger stand-alone label printer which is optimally placed on a surface, such as a desk, before being operated.

FIG. 1 shows in plan view a first label printing device which has two cassettes arranged therein. Typically, this label printing device 1 is a handheld or small desktop device which is powered by batteries at least part of the time. Alternatively the label printing device may be mains powered. The upper cassette is located in a first cassette receiving portion 26 and contains a supply of image receiving tape 4 which passes through a print zone 3 of the tape printing device 1 to an outlet 5 of the tape printing device 1. The image receiving tape 4 comprises an upper layer for receiving a printed image on its upper surface and has its other surface coated with an adhesive layer to which is secured a releasable backing layer. The upper cassette 2 has a recess for accommodating a platen 8 of the tape printing device 1, and guide portions 22 and 24 for guiding the tape through a print zone 3. The platen 8 is mounted for rotation within a cage moulding 10. Alternatively the platen could be mounted for rotation on a pin.

The lower cassette 11 is located in the second cassette receiving portion 28 and contains a thermal transfer ribbon 12 which extends from the supply spool 30 to a take-up spool 32 within the cassette 11. The thermal transfer ribbon 12 extends through the print zone 3 in overlap with the image receiving tape 4. The cassette 11 has recess 14 for receiving a print head 18 of the label printing device 1 and guide portions 34 and 36 for guiding the thermal transfer ribbon 12 through the print zone 3. Print head 18 is moveable between an operative position shown in FIG. 1, in which it is in contact with the platen 8 and holds the thermal transfer ribbon 12 and the image receiving tape 4 in overlap between a print head 18 and the platen 8 in an inoperative position in which it is moved away from the platen 8 to release thermal transfer ribbon 12 and image receiving tape 4. In the operative position, the platen 8 is rotated to cause the image receiving tape 12 to be driven past print head 18 and the print head 18 is controlled to print an image on the image receiving tape 4 by thermal transfer of ink from the ribbon 12. Each of the printing elements on the print head 18 is activatable separately and is activated in accordance with the desired image to be printed. The label printing device 1 has a lid (which is not shown) which is hinged along the rear of the cassette receiving portions 26 and 28 and which covers both cassettes when in place.

A DC motor 7 (see FIG. 3) continuously drives the platen 8. The platen is arranged to drive the image receiving tape 4 through the print zone 3 by the actuation of its own rotation. In other embodiments, transport of the image receiving tape across the print head can be done by other means, such as by a separate driven roller of the printer or of the cassette, or by a pair of cooperating rollers positioned on opposite sides of the tape, or by other means.

The image is printed by the print head 18 on the image receiving tape on a column by column basis with the columns being adjacent one another in the direction of movement of the tape 4.

Figure 2:
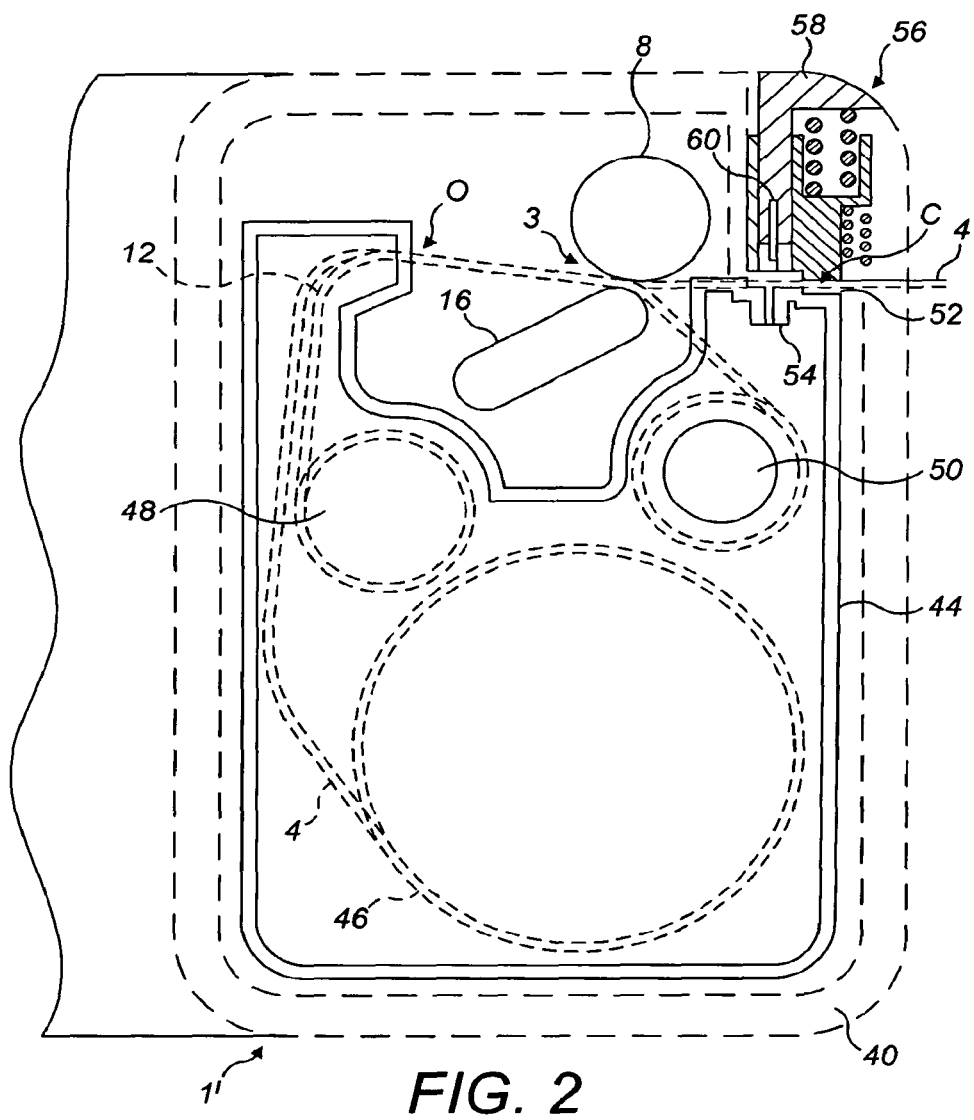
FIG. 2 is plan view of the second label printing device using a one cassette set system.

FIG. 2 illustrates in plan view a cassette bay of a second printing device 1' which uses a one cassette system. Like reference numerals are used for those parts which are also shown in FIG. 1. The cassette bay is shown by the dotted line 40. The cassette bay 40 includes a thermal print head 18 and a platen 8 which cooperate to define a print zone 3.

The print head 18 is pivotable about a pivot point so that it can be brought into contact with the platen 8 for printing and moved away from the platen 8 to enable the cassette to be removed and replaced as in the first embodiment. A cassette inserted into the cassette bay 40 is denoted generally by reference numeral 44. The cassette 44 holds a supply spool 46 of image receiving tape 4. The image receiving tape 4 is guided by a guide mechanism (which is not shown) through the cassette 44, out of the cassette 44 through an outlet 0 past the print zone 3 to a cutting location C. The same cassette 44 also has an ink ribbon supply spool 48 and an ink ribbon take up spool 50. The ink ribbon 12 is guided from the ink ribbon supply spool 48 through the print zone 3 and taken up on the ink ribbon take up spool 50. As with the first embodiment, the image receiving tape 4 passes in overlap with the ink ribbon 12 through the print zone 3 with its image receiving layer in contact with the ink ribbon 12. The platen of this second embodiment is also driven by a motor 7. The motor rotates to drive continuously the image receiving tape through the pint zone 3 during printing. In either of the embodiments, it is possible that the tape be driven in a step wise manner by a stepper motor.

An image is printed on the tape fed out from the print zone to the cutting location C which is provided at a location in a portion of the wall of the cassette 44 which is close to the print zone 3. The portion of the wall on the cassette 44 where the cutting location C is defined is denoted by reference 52. A slot 54 is defined in the wall portion 52 and the image receiving tape 4 is fed past the print zone 3 to the cutting location C where it is supported by facing wall portions on either side of the slot 54.

The second label printing device 1' includes a cutting mechanism 56 including a cutter support member 58 which carries a blade 60. The blade 60 cuts the image receiving tape 4 and then enters the slot 54. It should be appreciated that the first embodiment will usually also include a cutting mechanism.

Figure 3:
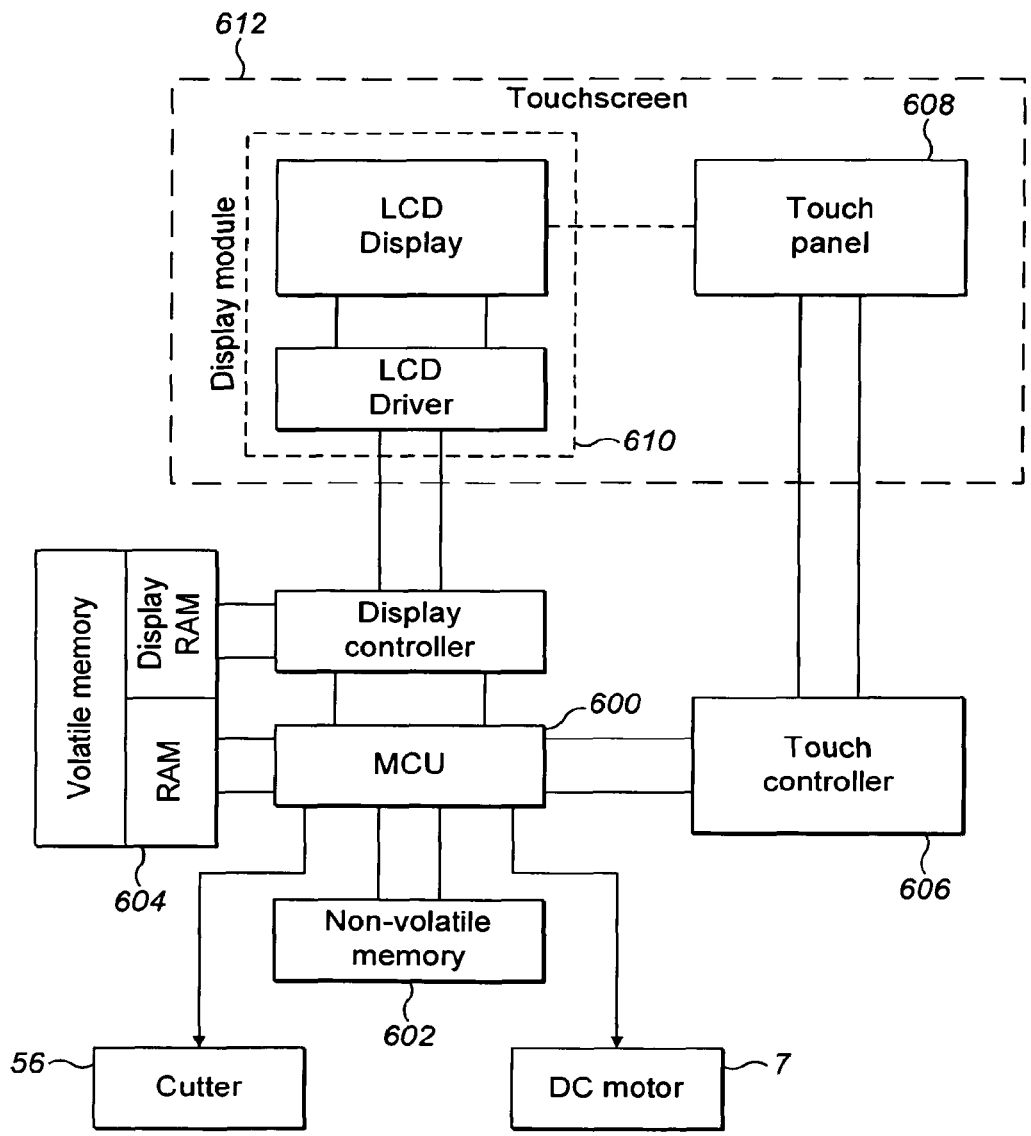
FIG. 3 is a diagrammatic sketch showing the control circuitry in an embodiment of the present invention.

Basic circuitry for controlling the tape printing device 1 of FIG. 1 or the tape printing device 1' of FIG. 2 is shown in FIG. 3. There is a micro controller unit (MCU) 600, a non-volatile memory 602 which is for example a read only memory (ROM) or a flash type of memory. The flash type of memory may be used in place of, or in addition to the read only memory. A volatile memory comprising a random access memory RAM 604 and/or display RAM is also provided. The MCU 600 is connected to receive label data input to it from a data input device such as a touch panel 608 of a touchscreen 612 via a touch panel controller 606. In alternative embodiments, the data input device may be a hardware keyboard including plural keys. The MCU 600 outputs data to drive the display 610, which together with the touch panel 608 form the touchscreen 612, to display a label to be printed (or a part thereof) and/or a message for the user. Additionally, the MCU 600 also outputs data to drive the print head 18 so that the label data is printed onto the image receiving tape to form a label. Finally, the MCU 600 also controls the motor 7 for driving the platen. The MCU 600 may also control the cutting mechanism 56 of FIG. 2 or a cutting mechanism of the device shown in FIG. 1 to allow a length of tape to be cut off. In alternative embodiments at least part of the cutting mechanism may be manually operated.

Figure 4:
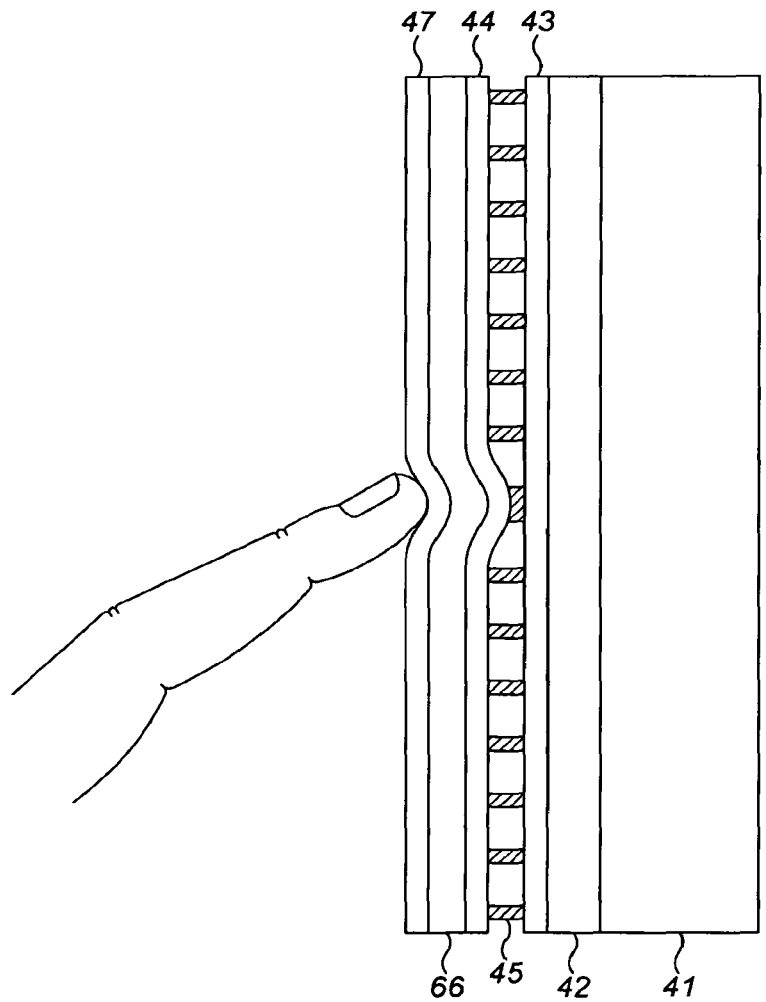
FIG. 4 is a diagram of a resistive touchscreen used as an input device according to an embodiment of the present invention.

A touch panel 608 is shown in FIG. 4. FIG. 4 shows a resistive touchscreen system. In this embodiment the touchscreen system is integral with the printing device. There are other systems that are used to recognise a person's touch that are well known in the art and could be used in place of the resistive system and still be within the scope of some embodiments of this invention. Such systems include the capacitive touchscreen system, in which a local change of capacitance is sensed and used to determine the point at which the screen was touched, and the surface acoustic wave touchscreen system. However reference will only be made to the resistive touchscreen system as an example of an embodiment with reference to FIG. 4. The resistive touchscreen system consists of a glass (or other suitable material such as plastics) panel 42 overlying the LCD display or any other type of display 41. The glass panel 42 is covered in a uniform resistive coating 43. A thick polyester cover sheet 46 is suspended over the resistive coating 43, separated by small transparent insulating dots 45. The surface of the coversheet facing the glass panel 42 is covered in a conductive coating 44. The opposite outer side of the coversheet 46 is covered in a scratch resistant coating 47.

Figure 4A:
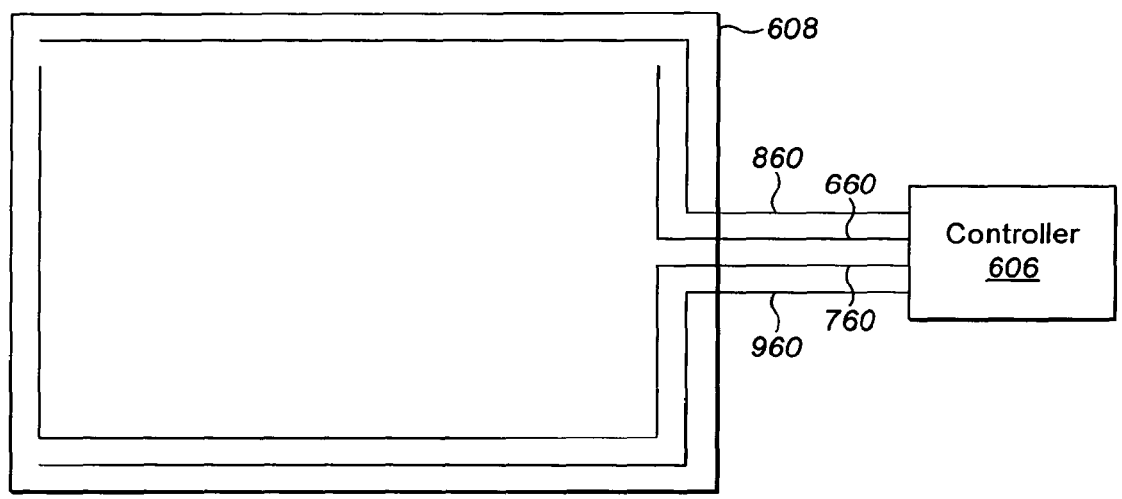
FIG. 4a shows the construction of part of a resistive touchscreen according to an embodiment of the present invention.

Four wires are arranged within the touchscreen panel 608. Wires 660 and 760 are arranged at the respective side edges of one of the conductive surface 44 and the resistive layer 43, as shown in FIG. 4a. Wires 860 and 960 are arranged at the respective top and bottom edges of the other of the conductive surface 44 and the resistive layer 43. The resistive layer 43 is biased at the supply voltage (for example +5V or 3.3V) through four drive lines (not shown), and the coversheet is grounded through a high resistance. When the screen is touched the conductive coating 44 on the coversheet 46 is pushed against the resistive coating 43 on the glass panel 42, making electrical contact an electrical current runs through the conductive and resistive metallic layers. The voltage produced between the point of contact between the conductive layer 44 and resistive layer 43 and between the wires 660, 760, 860 and 960 are detected by the controller. Wires 660 and 760 detect the voltage produced by the touch along the x axis, whist wires 860 and 960 detect the voltage produced along the Y axis. The wires 660, 760, 860 and 960 are connected to analogue to digital converter (not shown) which forms part of the touchscreen controller 606. The analogue to digital converter converts the voltages into a digital signal. The controller 606 translates the signal into x and y coordinates to be sent to the MCU 600. Operation of a resistive touchscreen is well known to the skilled person, and so the arrangement of FIG. 4a will not be described in any further detail.

First embodiments of the present invention will now be described with reference to FIGS. 5a to 5j.

Figure 5A:
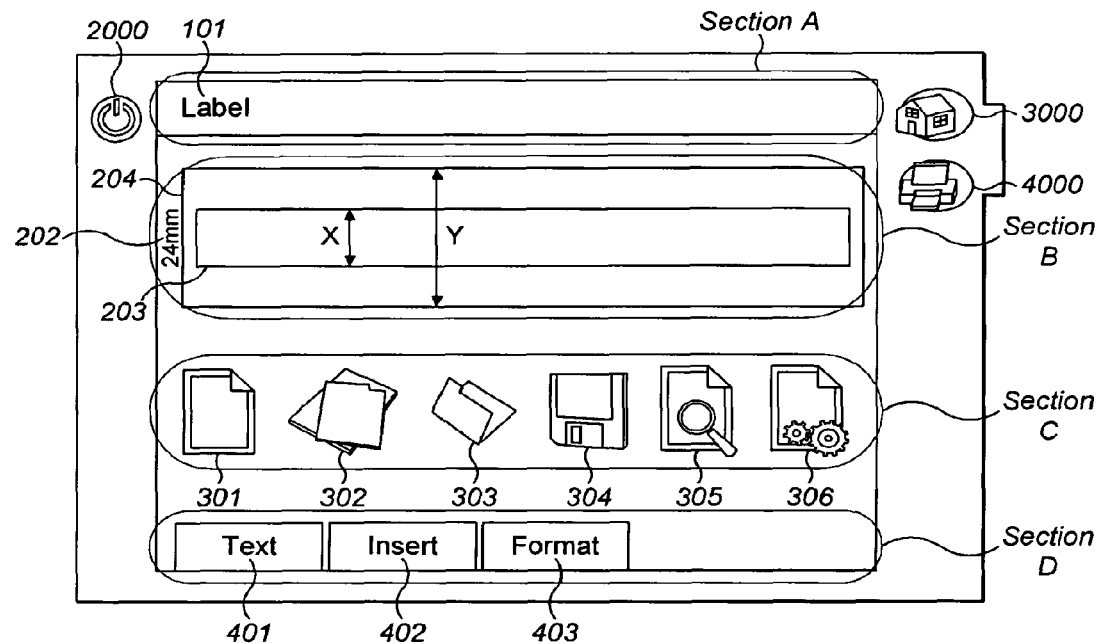
FIGS. 5a to 5k show exemplary input screens in embodiments of the present invention.

FIG. 5a shows part of a label printer including a touchscreen 1000, a power on/off button 2000, a home button 3000, and a print button 4000. The touchscreen 1000 in FIG. 5a shows a "home" display or screen, which is presented to the user when the printing device is switched on by pressing button 2000. It is to be noted that, whenever the user presses the home button 3000, the "home" screen shown in FIG. 5a is displayed.

The touchscreen includes four sections. Section A is a header and includes information 101 indicating the mode the printer is currently working in or the name of a label currently shown in the display and open for editing. In FIG. 5a, the header includes text information spelling the word "Label". This tells the user that they are in a label-creating mode and the label being created has not yet been saved with an associated file name. In other embodiments, the information 101 may be text spelling the phrase "unsaved label", or similar, to indicate that the label being created has not yet been saved with an associated file name. If the label is saved, the information 101 may be text spelling the phrase "label: file name". As will be seen in other Figures, the header can display alternative information indicative of a different function, mode or displayed screen, in dependence on the information displayed in other sections of the display.

Section B is configured to display a representation of label data to be printed onto the medium. In this embodiment the display is a WYSIWYG (what you see is what you get) display. In some embodiments, such as that shown in FIG. 5a, Section B also displays an indication 202 of the width of the medium. In this embodiment this indication of the width is given both as a number 202, and also as the height "X" of rectangle 203 relative to the height "Y" of the boundary 204 of Section B. In FIG. 5a, no print data has yet been entered and so the rectangle 203 is empty.

Figure 5B:
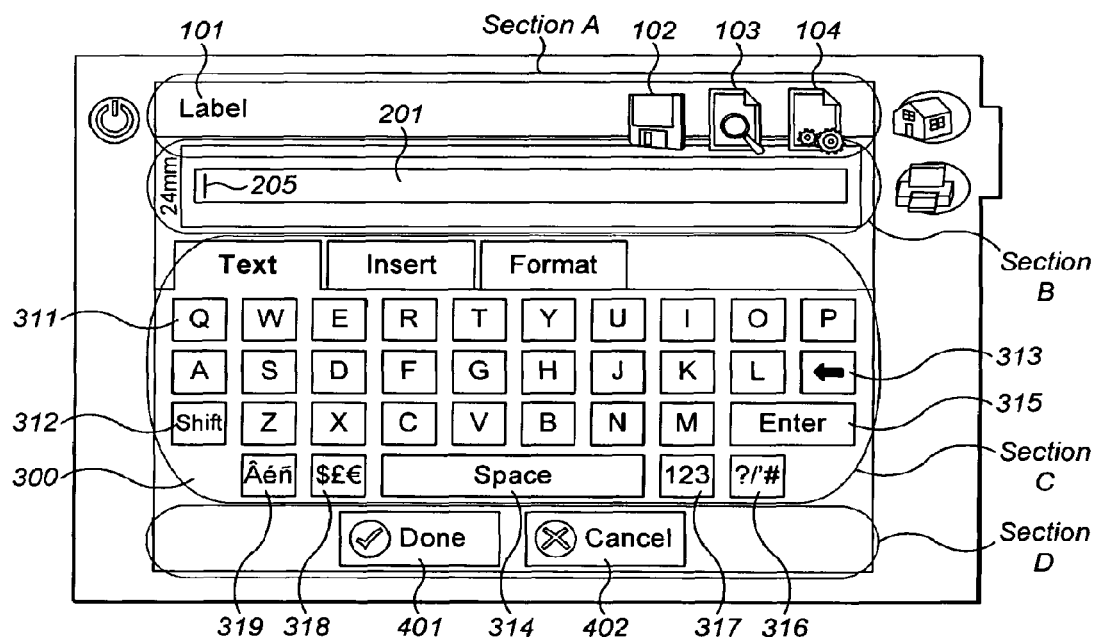

The user is presented with several options which are selectable by touching an area within the control panel of section C of the screen, as described below. Section C of the screen includes a number of graphic "tabs" 401 to 403, which are respectively labelled "Text", "Insert", and "Format". Each of the tabs is selectable by touching the area of Section D bounded by that tab. So, for example, if the user selects the "Text" tab 401, the controller 606 generates the coordinates of the position of the touch and sends them to the microprocessor 600. In some embodiments, stored in the ROM 602 is a series of look up tables each relating to different selection screens. The look up table referred to by the processor 600 is the one which relates to the screen currently being displayed. Thus when screen 5a is displayed look up table corresponding to screen 5a is referred to. Coordinates corresponding to those which fall within area 401 of Section D of screen 5a are stored within the look up table and instruct microprocessor 600 to display the screen of FIG. 5b. When the coordinates of the touch correspond to any of those which are stored in the look up table as falling within area 401 of Section D of screen 5a, the display changes to that as shown in FIG. 5b. The tab "text" represents a screen area. In other embodiments without the lookup tables, if the touch input coordinates fall within this area, the code jumps to a routine that corresponds to the function "text". The screen is thus divided up into objects, of which the object "text" is an example. The software detects if an object has been selected by comparing the input coordinates with the object's coordinates.

In FIG. 5b, Section A and Section B still show the header information 101 and the representation 201 of label data to be printed onto the medium, as in FIG. 5a. However, Section A now also includes areas 102, 103 and 104. Area 102, 103 and 104 are, respectively, a label save input area, a label preview input area, and a device settings input area, which correspond to areas 304, 305 and 306 in FIG. 5a. These will be discussed below. Also, Section C of the display now includes a different control panel from that shown in FIG. 5a. The tabs from Section D of FIG. 5a are now shown at the top of Section C in FIG. 5b. The leftmost tab, labelled "Text" is highlighted. The other two tabs are selectable, but not currently selected.

In other embodiments, a "back" key or "back" input area is provided on each screen presented to the user. By touching the screen within the back input area, the display is changed to present to the user the screen viewed immediately before the current screen. In some embodiments, such a back key is provided on most or every screen presented to the user. In some embodiments the back key is a hardware key positioned on the printer device.

The control panel in Section C in FIG. 5b is a visual representation of a keyboard 300 including an arrangement of keys 311, or data "input areas". A data input area is a portion of a display that includes information associated with a function. When the user touches the screen within the portion of the display, a signal is sent from the touchscreen to the MCU 600. The MCU 600 then processes the information from the touch in a similar manner as previously described. In the scenario shown in FIG. 5b, if the user touches the portion of the display that includes the character "A", then the MCU 600 causes the touchscreen to present the character "a" within the representation of the label data to be printed, in Section B of the screen. The letter "a" is positioned in Section B at the position of a cursor 205. The cursor 205 then moves to the right of the newly-added letter. If the user subsequently touches the character input area labelled λλZ", then a "z" is placed at the new position of the cursor 205, and the cursor again moves to the right, and so on. In some embodiments the cursor 205 blinks, i.e. appears and disappears cyclically, so a user can quickly determine the position of the cursor 205 when viewing the screen.

A user can choose to capitalise a letter to be added to the text string shown in section B by pressing the shift key 302 shown in FIG. 5b. After the shift key 312 has been touched, any subsequent data input areas 311 associated with characters which are touched by a user result in the respective associated character being presented in section B in a capitalised form. Thus the letter "a" would be presented as "A". Non-capitalised letters can be added to the data in Section B by pressing the shift key 302 again, which "deactivates" the mode. In other embodiments a key marked with the text "a→A" may be provided which, when selected, results in subsequently selected letters to be added to the representation in Section B in capitalised form.

Further keys are shown within section C, i.e. the keyboard, of the touchscreen shown in FIG. 5*b*. When the backspace key 313 is touched by the user, the character to the left of the cursor 205 in section B is deleted. When the space key 314 is touched, a space is added to the data in Section B at the position of the cursor 205. When the carriage return key 315 is touched, the cursor 205 moves down a line in Section B creating a new line. Touching character keys 311 after the cursor 205 has so moved down in Section B results in characters being added to a new line of label data.

In FIG. 5*b* the keys (input areas) of the keyboard representing letters of the alphabet are arranged in the "QWERTY" layout. The user is able to select a different keyboard layout with a different layout of such keys. The ROM 602 stores data defining plural different graphical keyboard layouts, as well as plural other graphical control panel layouts, such as that shown in FIG. 5*a*. Each stored layout includes an arrangement of data input areas of the respective graphical control panel or keyboard. When at any screen, the user can press home button 3000 and be presented with the screen shown in FIG. 5*a*. Within Section C of the screen in FIG. 5*a* is device settings area 306. Device settings area 306 includes a picture which indicates to the user the function "alter device settings". By touching the screen within device settings area 306 of FIG. 5*a* the user is taken to a further screen (not shown) which includes means for selecting one of the graphical keyboard layouts. In this embodiment the means for selecting is a series of further areas of the further screen. Each of the further areas is associated with one of the graphical keyboard layouts, and in some embodiments includes information indicative of the graphical keyboard layout with which it is associated. For example, one of the further areas may include the word "AZERTY". When the user touches that further area, a signal is sent to the MCU 600 and the microprocessor records in the ROM that the graphical keyboard to be displayed in future is one with data input areas (keys) arranged in the "AZERTY" layout. In another embodiment each of the further areas includes an indication of a language and is associated with a graphical keyboard layout. When the user touches a further area including an indication of a certain language, a signal is sent to the MCU 600 and the MCU records in the ROM the graphical keyboard associated with the language.

In one alternative embodiment, the label printer may be preprogrammed with the required layout.

Returning to FIG. 5*b*, the keyboard 300 includes twenty six character input areas associated with the twenty six letters of the Latin, or Roman, alphabet. In various embodiments of the invention, other keyboard layouts stored in the ROM 602 or flash memory include keys associated with characters of other alphabets, such as the Greek and Russian alphabets, and characters utilised in written Chinese and Japanese, i.e. keyboard layouts that enable the user to enter text in these character sets. Such control panels, or keyboards, can be presented in Section C by carrying out steps similar to those above for selecting the "AZERTY" keyboard layout.

Keyboard 300 includes punctuation data input area 316. When this is touched by the user, the user is presented with a punctuation control panel which overlays part or all of the other information on the screen. This punctuation control panel is not shown in the figures. The punctuation control panel includes one or more areas corresponding to one or more respective punctuation symbols. When the user touches one of these areas in the punctuation control panel, then the punctuation mark illustrated within that area in the punctuation control panel is added to the string of text shown in section B. After the selected punctuation mark has been selected in this way, the punctuation control panel then disappears from view.

Keyboard 300 also includes numeric data input area 317. When this is touched by a user, then the user is presented with a numeric control panel which includes ten selectable areas, each of which corresponds to a respective one of numbers 0 though to 9. On touching one of these ten areas, the numeral or number associated with that area is added to the data in section B of the touchscreen. The numeric control panel then disappears. In alternative embodiments, the user may touch several of the areas in the numeric control panel in series in order to add a string of numerals to the data shown in section B. In this alternative embodiment, the numeric control panel only disappears when the user presses an eleventh selectable input area in the numeric control panel. Such an eleventh selectable area may have the text "CLOSE" presented to the user within the eleventh selectable area.

Keyboard 300 includes currency data input area 318. When this is touched by a user, then a currency control panel is presented to the user which includes one or more selectable areas with one or more respective currency symbols shown within those areas. The user can select one of those areas to add a currency symbol to the data in section B of the touchscreen.

Keyboard 300 also includes accent data input area 319. Similarly to the numeric input area, when the accent input area 319 is touched by the user, then the user is presented with an accent control panel which includes plural accented character data input area (not shown). Each of the accented character data input areas has an accented character, such as the characters "é" and "á", shown within that area. When the user touches such an area, then an accented character associated with the touched accented character data input area is added to the string of text in section B. In embodiments, when the user touches accent data input area 319 they are presented with a suggestion box on the screen displaying a list of selectable accented characters, which list may include only the most commonly used accented characters.

In many embodiments the representation of the label data is displayed adjacent the data input areas. It is to be noted that in this embodiment of the invention, the representation of the label data is above some of the data input areas, i.e. those 311, 312 within Section C, and below some of the data input areas, i.e. those 102, 103, 104 within Section A. In other embodiments the relative locations of the representation and the data input areas can of course be different to this.

Figure 5C:
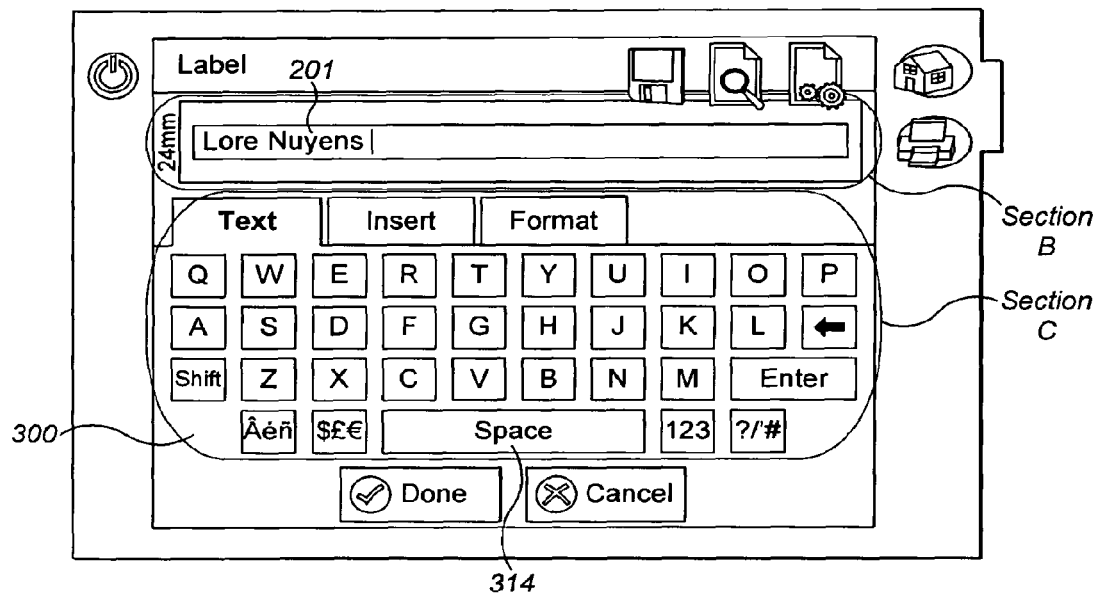

FIG. 5*c* shows the result of a user entering the label data "Lore Nuyens" into the printer, using the data input areas 311 and space key 314 of keyboard 300. In Section B of the screen displays a representation 201 of the label data to be printed onto a tape. Each respective keystroke changed the representation of the label data, since each keystroke added a new character or a space to the data.

The user may apply formatting to the label data by touching the tab labelled "Format" in Section C of FIG. 5c. The microprocessor 600 processes the information from the touch in a similar manner as previously described and changes the display to change the visual representation of the control panel within section C of the screen into a visual representation of a control panel within which label formatting functions are selectable. This is shown in FIG. 5d.

Figure 5D:
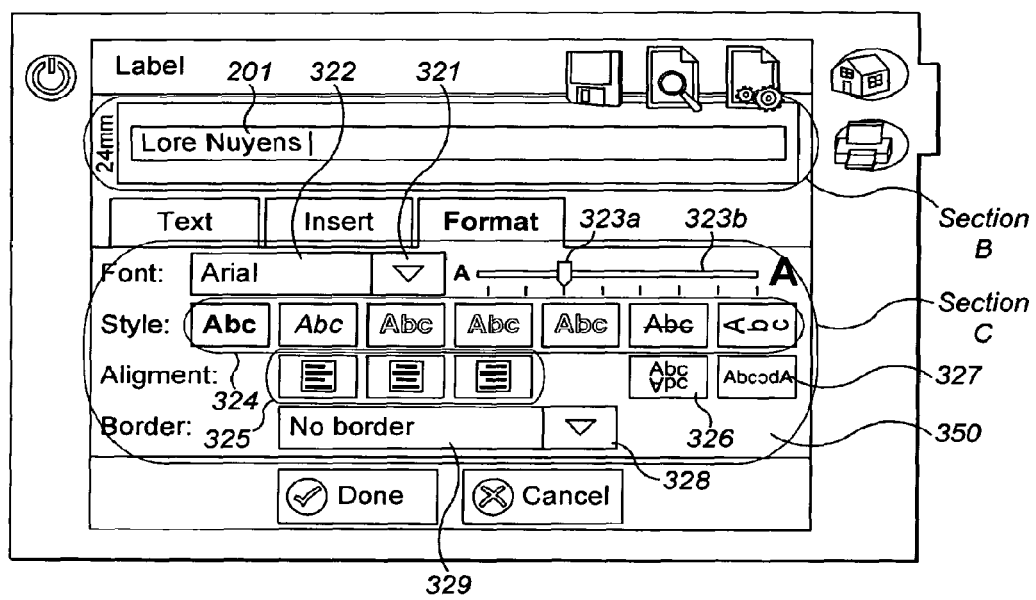

In FIG. 5d the control panel 350 includes plural data layout input areas, such as keys 321, 324 and pointer 323a. When a part of the display at which one of the data layout input areas is displayed is touched by the user, the layout or an attribute of the representation 201 of label data to be printed on the medium in Section B is changed. Additionally, the layout or an attribute of the label data, when it is printed onto the medium, is correspondingly changed. In this way, the representation in Section B is a WYSIWYG representation, i.e. the representation includes data formatted in the same way as data on a resultant printed label would be formatted.

So, if the user touches area 321 of section C in FIG. 5d, then a drop-down menu including a list of different available character fonts is presented to the user. The user can subsequently select one of those fonts, and the text in the representation 201 in section B of the touchscreen is revised so as to be presented in the newly-selected font. Area 322 of section C shows the current font of the text. In order to increase the size of the font shown in section B, the user must touch the scrollable pointer 323a and then drag the pointer 323a rightwards along the scale 323b. By "drag" it is meant that the user touches a point on the screen and then maintains contact with the touchscreen while moving their finger or other input device (e.g. a stylus) along the screen. Once the desired font size has been selected, the user withdraws their finger/stylus from the touchscreen. To reduce the font size, the pointer 323a is similarly moved leftwards along the scale 323b. In an alternative embodiment, the scale may be orientated in an up/down direction.

In some embodiments the scale 323b includes an indication of the font size (e.g. 12 pt, 14 pt) associated with each of the notches on the scale, i.e. the size that would be selected if the pointer 323a was positioned at each of those respective notches. It is also possible in some embodiments to select a font size by touching a point along the scale 323b, rather than by dragging the pointer 323a to the required point.

Character size can alternatively also be selected by a dropdown menu, in other embodiments, similarly to the way in which font type is selectable as just described.

Within area 324 of section C of the touchscreen in FIG. 5d are seven selectable data layout areas, or keys. By touching one of these seven keys, the user is able to perform a respective associated formatting function to the text within the representation in section B of the display, and thus the text that will be printed onto a resultant label. The seven selectable keys in area 324 of section C in FIG. 5d are associated with the following respective formatting functions: emboldening the text, making the text italic, giving the text a black outline with a white fill, making the text bold, giving the text a shadow, striking through the text, and rotating each of the characters of the text by 90° such as to produce a vertical label.

Within area 325 of section C of the touchscreen in FIG. 5d are three selectable keys which, when touched by the user, alter the justification of data shown in section B. The leftmost key left-justifies the data (i.e. biases the data to the left of Section B), the rightmost key right-justifies the data, and the middle key centralises the data within section B of the display. These justifying functions also alter the justification of the data that will be printed on a resultant label.

If the user touches key 326 within section C, then the text included in the representation in section B (and the result printed text) is mirrored about a horizontal axis. Similarly, if the user touches a point within key 327 of section C, then the text shown within section B (and the resultant printed text) is mirrored about a vertical axis.

Figure 5E:
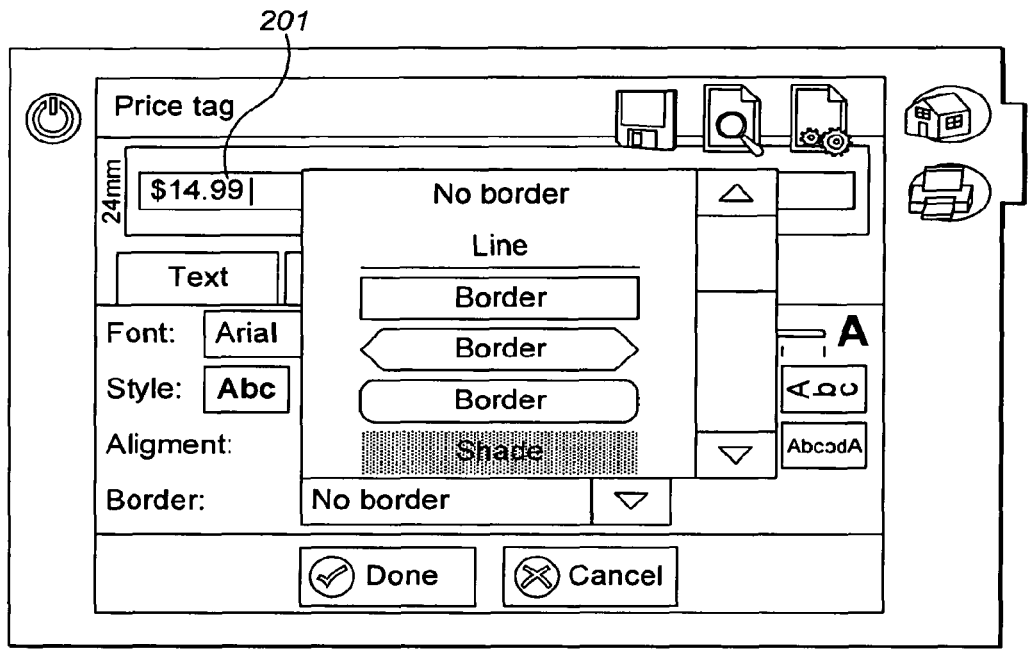
Figure 5F:
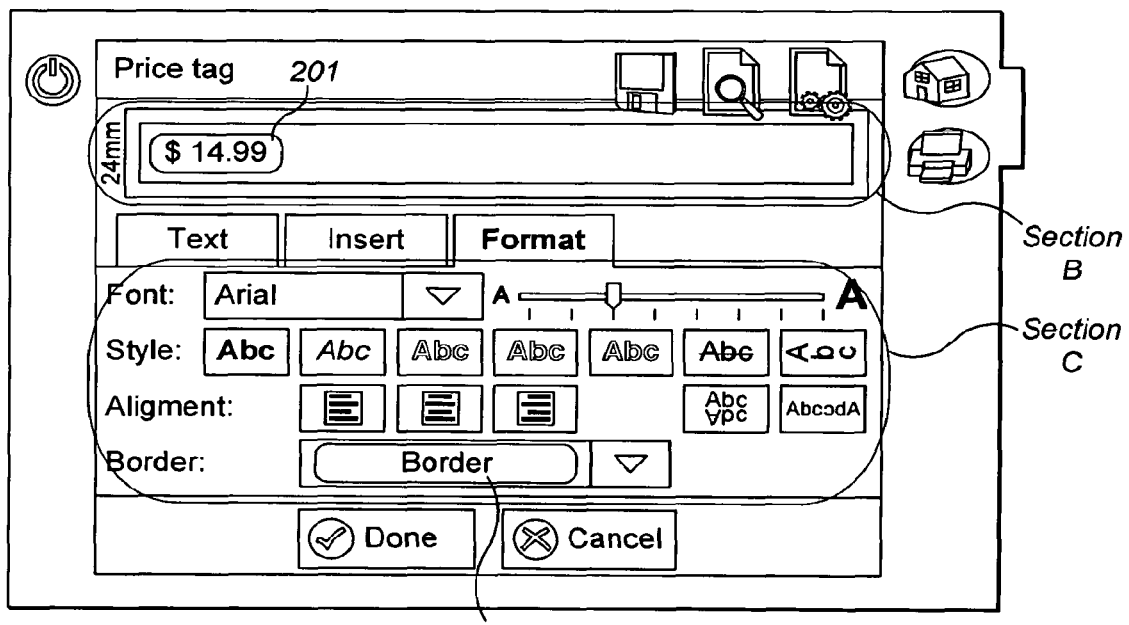

Finally, when the user touches a point within area 328 of section C shown in FIG. 5d, then the user is presented with a drop-down list of borders and shading which can be applied to the label data and thus to the printed label. An example of such a drop-down list is shown in FIG. 5e. The user can select a border to apply to the label data, and hence the resultant printed label, by touching the associated area of the drop-down list shown in FIG. 5e. Immediately after the user has selected the required border, the drop-down list disappears and section B of the display shows the selected border applied to the label data in WYSIWYG style. See FIG. 5f, which is the resultant display if the user faced with the drop-down list in FIG. 5e selected the bottom-most border, i.e. the rounded border. An indication of the selected border is given in area 329 of Section C, as well as in the representation 201 in Section B. It is to be noted that the representation 201 of the label data in FIGS. 5e and 5f is different to that in FIG. 5d, but the principle of operation of the drop-down list is the same.

For those options which are selected by the dropdown menu, the label may be arranged to change when the user selects the particular option, before the dropdown menu has been closed. For example, the user may move the pointer or his finger down the menu, with the displayed label changing as the user changes between options.

Returning to FIG. 5d, in this example the user decides to embolden and enlarge the text in Section B, and apply a different font to it. This is performed as described above. The resultant display presented to the user is shown in FIG. 5g.

Figure 5G:
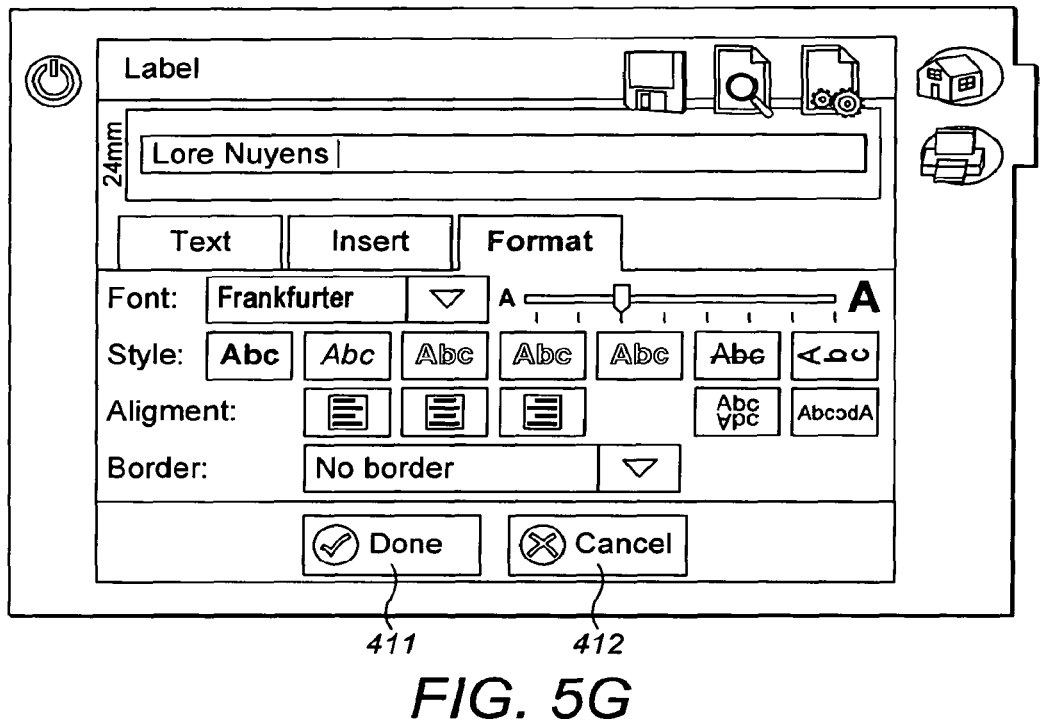

Section D of the screen in FIG. 5g includes two input areas, or keys 411, 412, labelled "Done" and "Cancel", respectively. If the users are not happy with the label data they have created, they touch key 412 and they are returned to the home screen as shown in FIG. 5a. The representation 201 of the label data in Section B of the screen in FIG. 5b does not include any text or images to be printed.

Figure 5H:
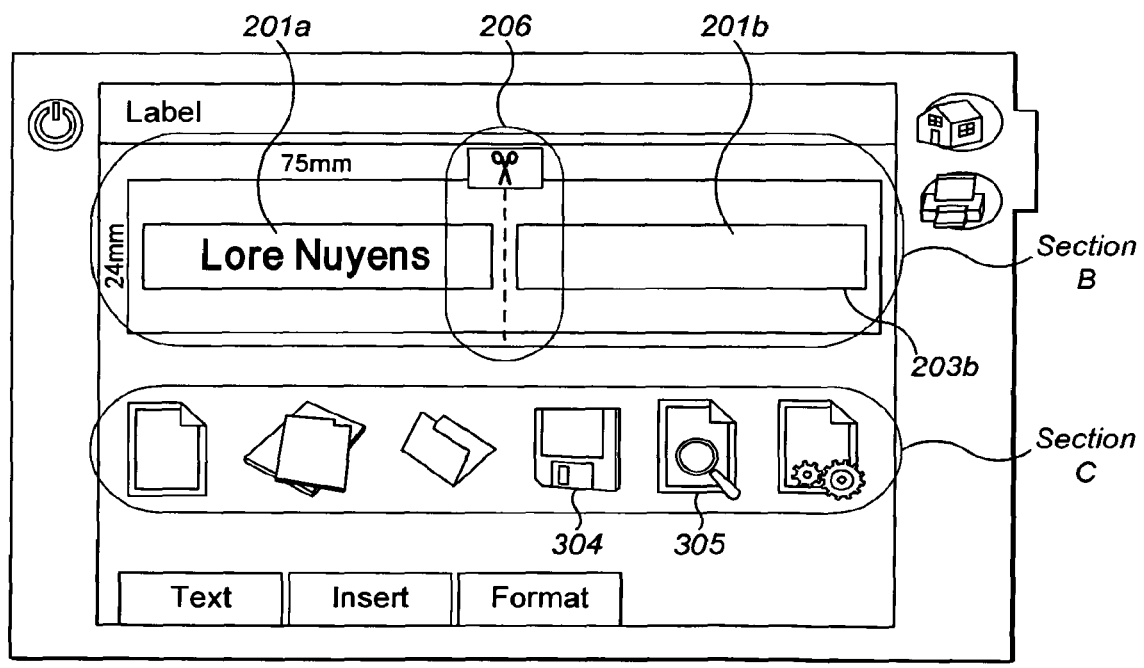

If the users are happy with the label data they have created, they touch key 411 and they are then returned to the home screen as shown in FIG. 5h. Section B of the screen in FIG. 5h includes the representation of the label data just created. Section B also shows a representation 206 of a position at which the tape is to be cut by cutting means of the printer. Other embodiments may not include this representation 206. In different embodiments the cutting means can vary. The cutting means may be a single blade configured to pass through the tape and either hit an anvil or enter a slot. Alternatively, the cutting means may be a pair of blades that come together to cut the tape in a scissor action. Other cutting means are also considerable, without departing from the scope of some embodiments of the present invention. The representation in Section B includes label data 201a to be printed onto the tape as a first label, and label data 201b to be printed onto the tape as a second label. In alternative embodiments the representation only includes the data 201a just created and thus the data to be printed onto the tape as a first label.

Label data 201*b* currently does not include any text or images. If the user wishes to create a second label, they touch the screen within Section B within the rectangle 203*b* surrounding the label data 201*b* to be printed onto the tape as a second label. (In embodiments in which only the data 201*a* to be printed onto the tape as a first label is shown, a key labelled "Multi label" or similar may be touched by the user to create an additional label in a multi-label user interface, which additional label would be printed in series after the first label). When they touch the screen within Section B, a second signal is sent to the MCU 600 in a similar fashion to that which has been previously described. The second signal is different from a signal sent to the MCU 600 when a different area of the screen is touched, thus allowing the MCU 600 to determine which portion of the screen has been touched. As a result of touching the screen within the rectangle 203*b* in Section B, the user is presented with the screen shown in FIG. 5*b* and can create another label. When they later touch the "Done" key 401 in FIG. 5*b*, they are returned to the screen shown in FIG. 5*h*, except it will differ since the label data for the second label will be shown as a representation 201*b* within rectangle 203*b* in Section B of FIG. 5*h*. If they instead hit the "Cancel" key 402 in FIG. 5*b*, they would be returned to the screen shown in FIG. 5*h* without any label data in rectangle 203*b*.

Thus, depending on where the user touches the screen, a different action is initiated. Information associated with that function is displayed to the user in the portion of the screen which is touchable to initiate the function.

Returning to FIG. 5*h*, if the user wants to save the label data for future re-use, they must touch input area 304 within Section C of FIG. 5*h*. This input area includes a representation of the save function associated with the input area, that representation being a floppy disk. After touching area 304 in FIG. 5*h*, the MCU 600 processes the information from the touch as described above and changes the display so that the screen shown in FIG. 5*i* is presented to the user.

Figure 5I:
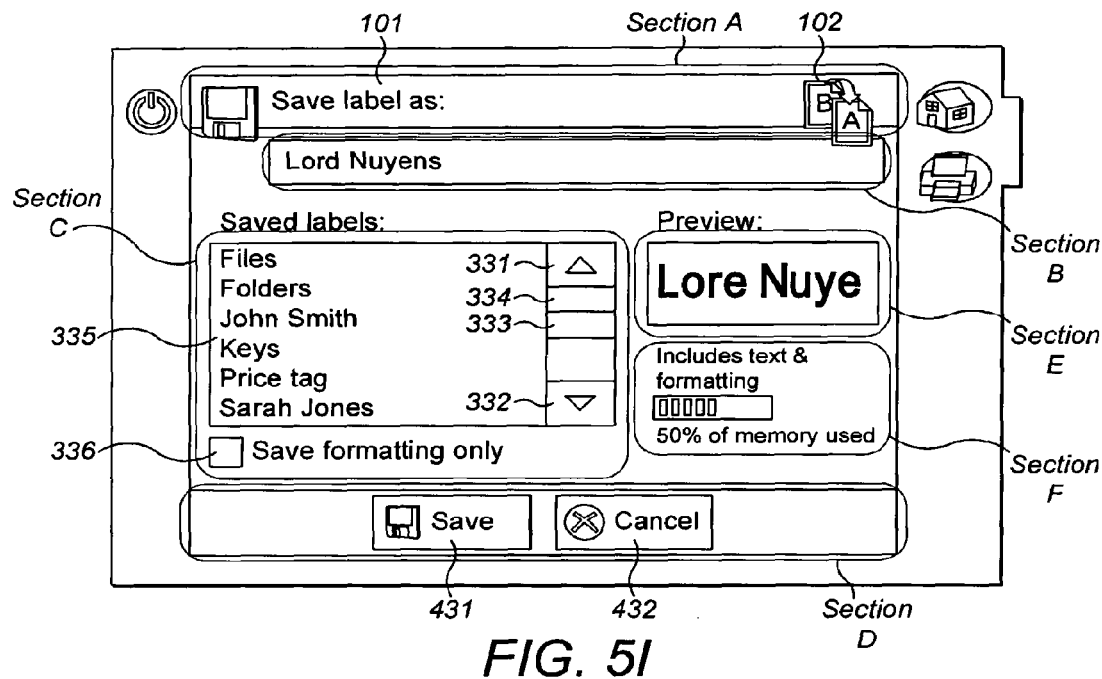

A preview of the created label is shown within Section E of the screen of FIG. 5*i*. Section E includes some of the label data from the representation 201*a* shown in Section B of FIG. 5*h*. Section A of the screen in FIG. 5*i* includes information 101 indicating that the printer is currently working in save mode, i.e. the save control panel is presently displayed. Section B of FIG. 5*i* includes an indication of a default name for the label, under which reference the label can be saved in memory. The default name is the same as the text within the label data. The user can change the name by touching the screen in area 102 of Section A. In other embodiments, area 102 may comprise a different icon, such as one including the word "rename". In embodiments, the user can change the name by touching the default name included within Section B of FIG. 5*i*.

Figure 5J:
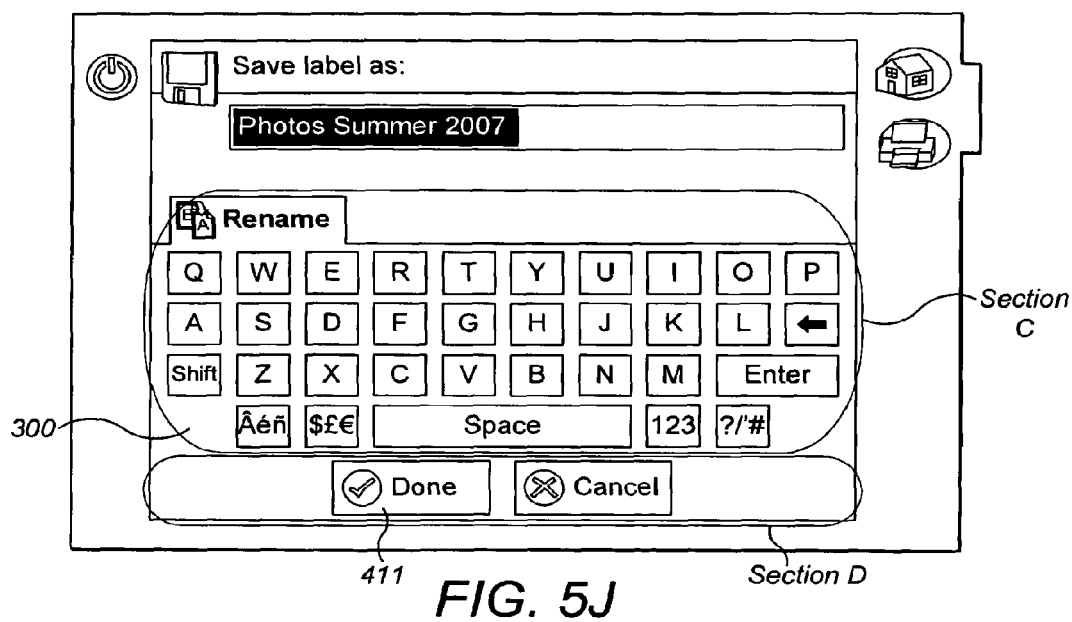

After choosing to rename the label, the user is then presented with the screen shown in FIG. 5*j*, which includes a keyboard in Section C. After entering a new name via the keys on the keyboard 300, the user touches the "Done" button 411 in Section D and is returned to the screen in FIG. 5*h*.

A list 335 of previously-saved labels is shown within section C. This list includes file names both of labels previously created by the user of the printing device, and also of labels which were created and saved during manufacture of the printing device. If the user touches part of the display where the list 335 is shown, then label data associated with the list item positioned at the point at which the user touches the display is shown in Section E, i.e. a preview of the label data is shown to the user. The user can scroll up the list by touching area 331, and can scroll down the list by touching area 332. Alternatively, the user can "drag" the slider 333 along the scroll bar 334 to scroll up and down the list 335. Scrolling may also be done by clicking and dragging quickly on the list 335 itself, rather than on the slider 333. The scrolling action of the present invention will now be described in more detail.

The plural file names are plural data entries which are stored within a memory. The memory in this embodiment is ROM 602 in the printer itself, but in other embodiments it may be provided in a device connected to the printer, such as a memory card. The display shown in e.g. FIG. 5*i* displays in list 335 information associated with a first set of the plural data entries, i.e. a first set of file names. When the user touches key 331 or key 332, which are at a different part of the screen to the list 335, the touchscreen sends an associated signal to a control means, which in this embodiment is the MCU 600. As a result, and depending on which of the two keys 331, 332 was pressed, the MCU 600 controls the display such that the list 335 in Section C shows a second set of the plural data entries, i.e. another set of file names. In some embodiments, some of the first set of data entries may be the same as some of the second set of data entries. In other embodiments the second set does not include any of the data entries of the first set. The slider 333 is moved along the scroll bar 334 by "dragging", as discussed above. In other words the user "strokes" the touchscreen. This sends an associated signal to the microprocessor 600 from the touchscreen.

In some embodiments, the signal thus sent to the MCU 600 is representative of the speed at which the user strokes the display. In some embodiments, the MCU is configured to control the touchscreen to display information associated with a second set of plural data entries relatively close to the first set of plural data entries in the list, when the signal is representative of a stroke with a speed above a threshold; and information associated with a second set of plural data entries relatively distant from the first set of plural data entries in the list, when the signal is representative of a stroke with a speed at or below the threshold. In some embodiments the threshold is configurable by the user.

If the user touches a point within area 431 of section D of FIG. 5*i*, then the newly-created label is saved to the ROM 602. If the label has a file name that is unique, i.e. not already assigned in the memory, then the file is saved as a new file in the ROM 602. A progress bar is shown in section F of the screen in FIG. 5*i*, to indicate what capacity of the ROM 602 is still available for saving labels thereto.

Figure 5K:
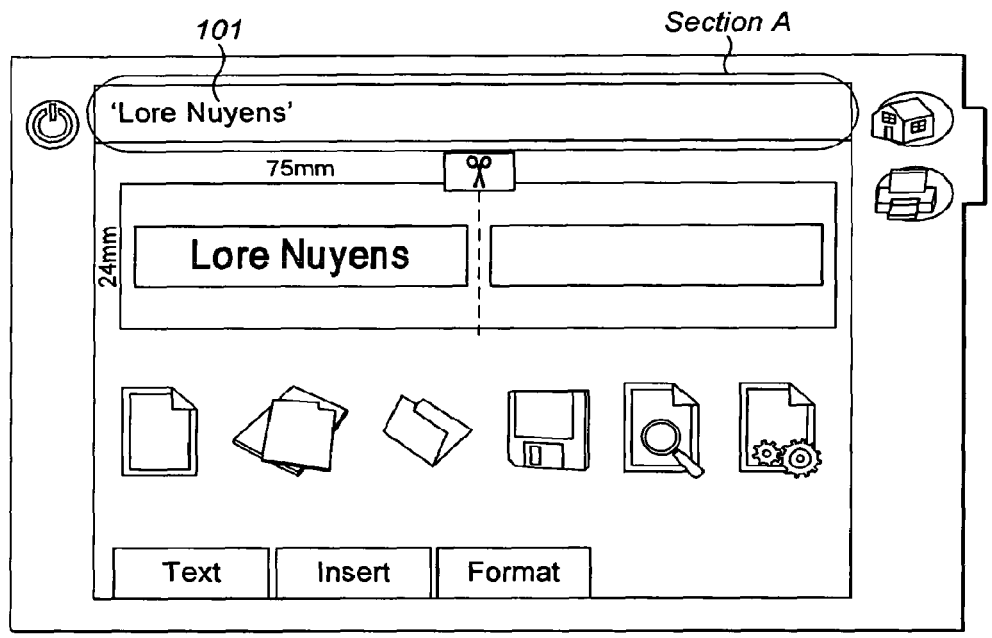

The user is then presented with the screen shown in FIG. 5*k*. Note that in Section A of this screen there is included information 101 indicative of the file name of the label just saved and now open on the screen, namely the words "Lore Nuyens".

If the user does not wish to save a particular set of label data, but would prefer to save a particular combination of label attributes, then the user can touch the screen within area 336 of section C to "check" the tick box. When the user subsequently touches area 431 of section D, then only the formatting data associated with the created label date is saved in the ROM 602. In this example, a file would be saved in the ROM 602 including the attributes: "Frankfurter" font, bold text, and a size of text associated with the fifth notch from the left on the scale 323*b* of FIG. 5*d*.

If the user does not wish to save the label data or the attribute data, then the user can touch a point within area 432 of section D of FIG. 5i which will return the user to the screen shown in FIG. 5h without saving the label or attribute data.

Before or after label data has been saved in the memory, the user can preview what the created label would look like when printed by touching area 305 in Section C of FIG. 5h. The user is then shown a full-screen representation (not shown) of the label data. If the text or data of the label is longer than the width of the screen, the preview scrolls across the screen in some embodiments. A similar preview can be seen by touching area 103 in FIG. 5b. Alternatively, if the text or data of the label is longer than the width and/or height of the screen, the label is partially previewed and a user can move the previewed label over the screen by dragging on the screen or by using a scroll bar in a similar manner to the way described above.

Before or after label data has been saved in the memory in this way, the user can print the label using the label printer. In order to do this, the user presses button 4000 to the right of the display. In other embodiments, the print function could be activated by touching a particular area of a Section of the screen. Either way, the MCU 600 then processes the information from this button press or screen touch and drives a printing mechanism of the printer, to print the label data onto a tape. After the label data has been applied to the tape, the tape is cut at a position corresponding to the position of the indicator 206 shown in section B of FIG. 5h.

It is to be emphasised that in this embodiment of the present invention the format of the label data included within Section B of the display is substantially the same as the format of the data which is printed onto the medium, such as label tape, after the printing operation has been initiated. That is to say that label display information used to produce the representation of the label has a substantially similar arrangement to the label print data which is sent to the printhead of the printer when producing a real label. In other embodiments, the print data may be such as to result in a printed label with a format different to that displayed in the representation.

Another feature of embodiments of the present invention will now be described with reference to FIGS. 6a to 6f.

Figure 6A:
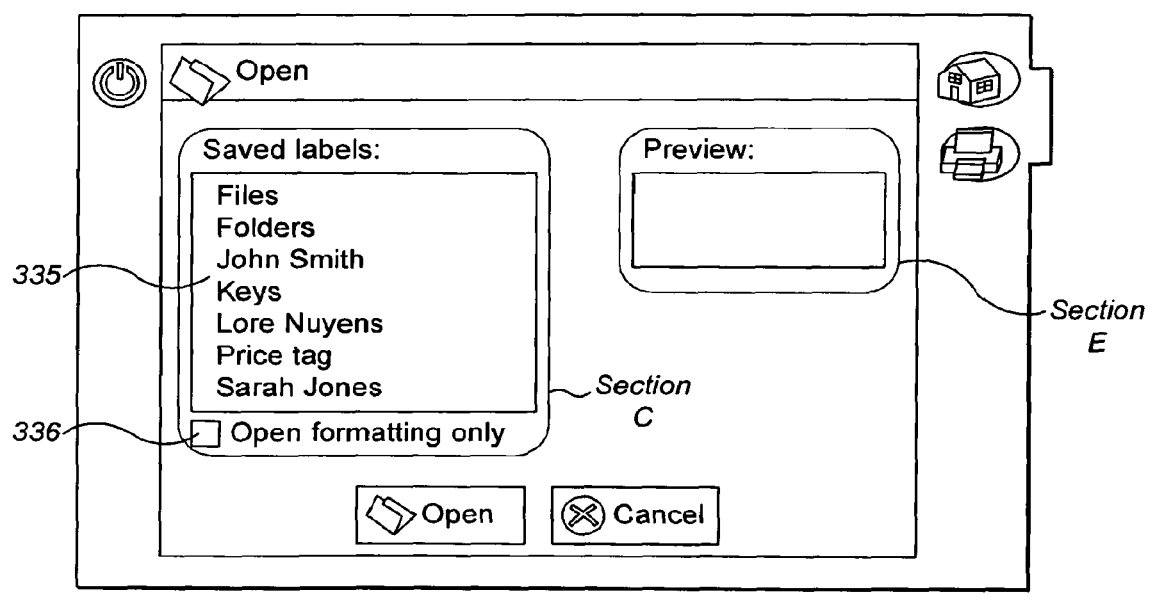
FIGS. 6a to 6f show exemplary input screens in further embodiments of the present invention.
Figure 6B:
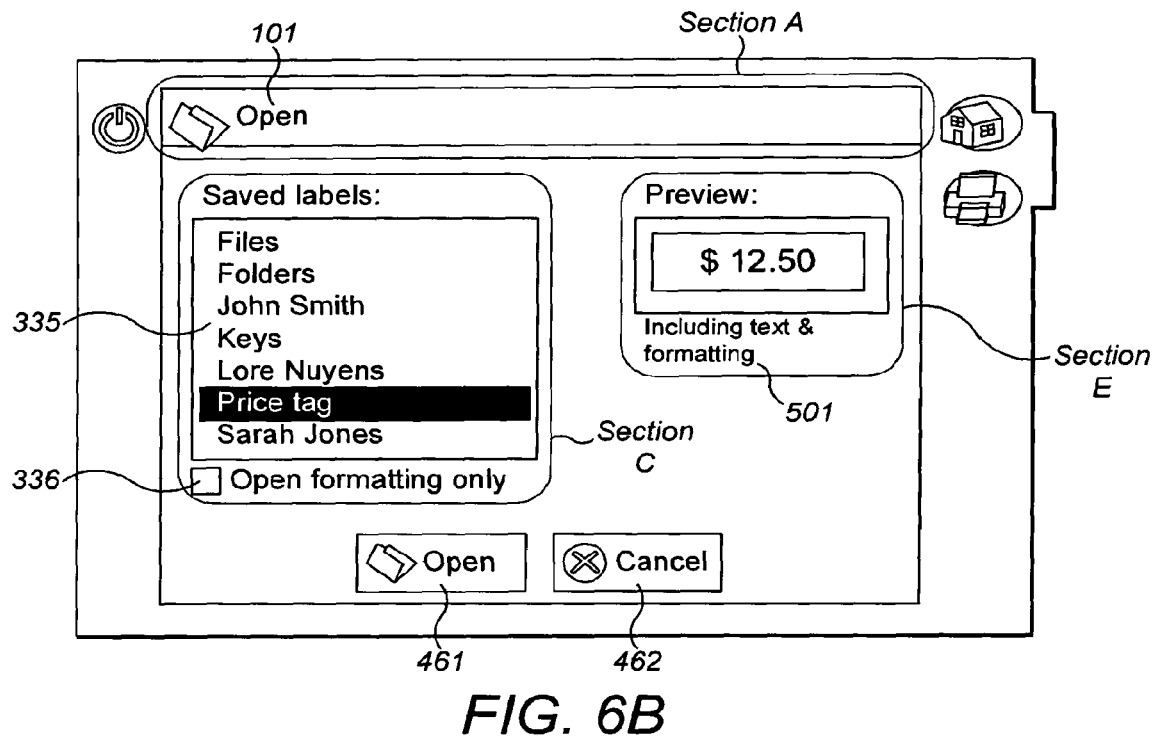

FIG. 6a shows the screen which is presented to a user when they touch the area 303 in Section C of FIG. 5a to recall a set of saved data from the ROM 602. Similarly to the save screen shown in FIG. 5i, a list 335 of file names associated with saved labels is presented to the user in Section C of the screen. When a user selects one of the file names from the list 335 by touching a part of screen overlying the file name, then a preview of the label data associated with the file name is shown in Section E of the screen in FIG. 6a. See, for example, FIG. 6b. In 6b an indication 501 that a saved file includes both label data and formatting data is shown in Section E. Section A of the screen includes an indication 101 to the user that they are currently in the "open file" screen. Just as a user could choose to save only attribute information associated with label data, as discussed above, in the screen shown in FIG. 6a the user is given the option to only recall attribute information associated with a saved label by checking the tick box 336 in Section C. Ticking this box enables the user to create a new label, perhaps with different text to the selected label, in the same style as the selected label. When the user has selected a label file name to open, he or she touches area 461 of Section D. They are then presented with the screen shown in FIG. 6c. To return to the home screen without opening a file, the user instead touches area 462 of Section D of FIG. 6a.

Figure 6C:
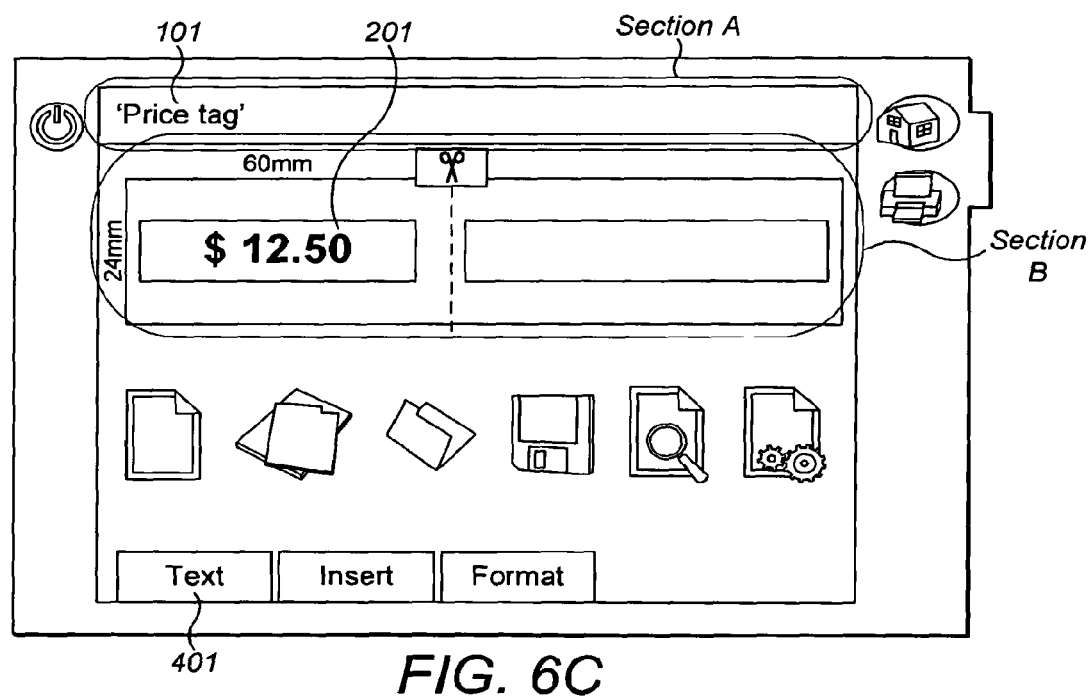

In embodiments, the user may also be able to "double tap" a label file name in the list 335 to open that file and arrive at the screen shown in FIG. 6c. Indeed, the user may be able to double tap any selectable option in any presented screen in order to access another screen, rather than selecting the option and then tapping "OK" or "Done" as is described at several parts of this description.

Figure 6D:
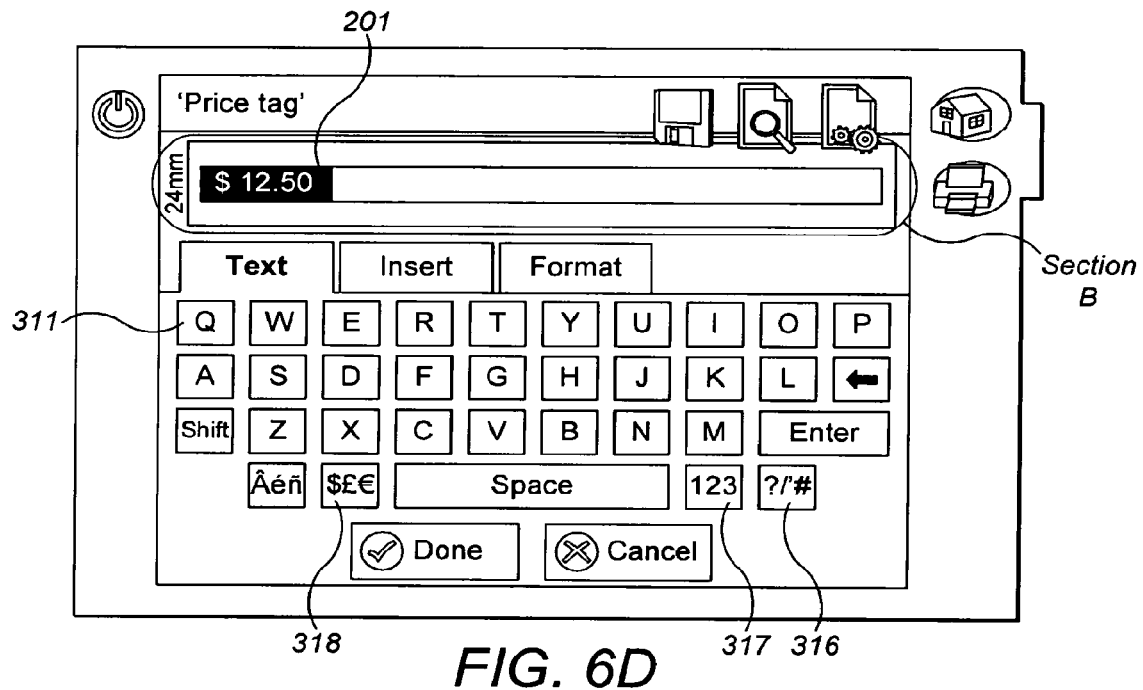
Figure 6E:
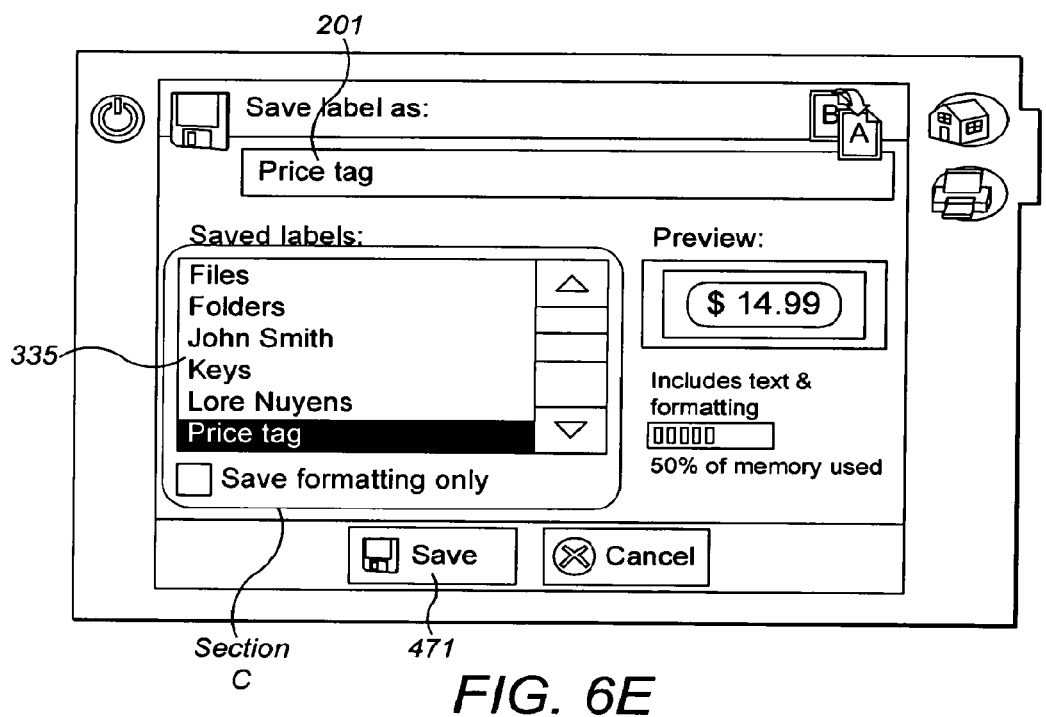
Figure 6F:
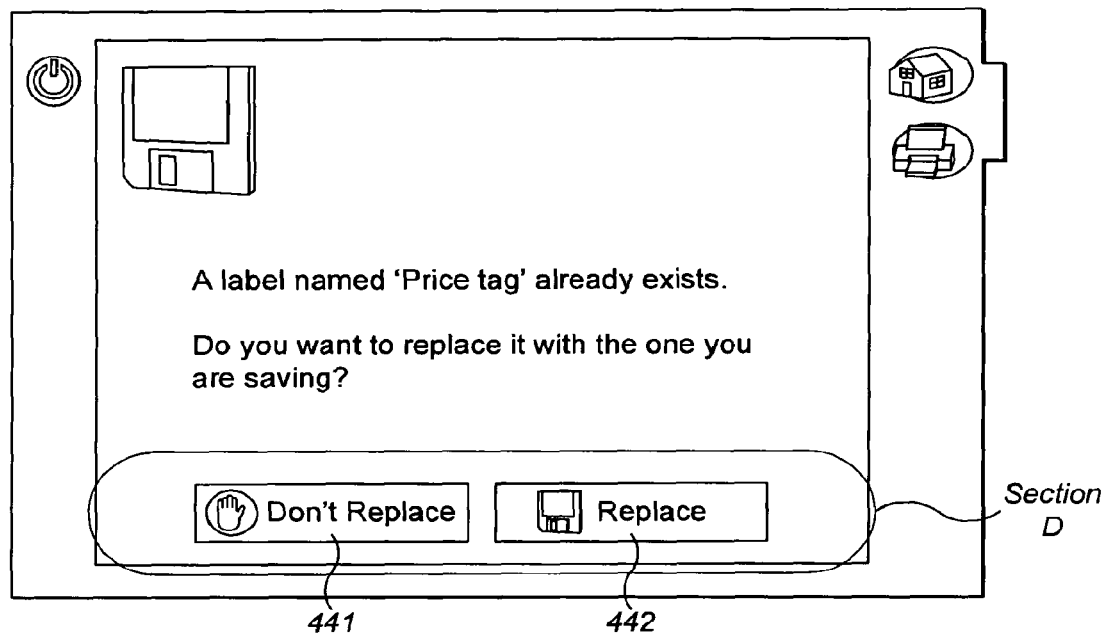

With reference to FIG. 6c, the home screen is shown with the selected label file open and the associated label data available for editing. A representation 201 of the label data is again given in Section B. Section A again includes an indication 101 of the file name of the file which is now open. The user can edit the label data by touching the area 401 which is associated with the tab labelled "Text". This presents the keyboard to the user again, as shown in FIG. 6d.

The user can overwrite the label data by dragging on the screen over the representation 201 of the label data shown in Section B. The process of dragging was described above and will not be described again in the interest of keeping the description brief. The label data is then highlighted, as shown in FIG. 6d. Instead of selecting all of the representation, the user could have instead only selected a portion of the representation for overwriting. The extent of selection is dependent on the start point, extent and end point of the dragging motion. With the representation 201 of the label data thus selected, the user can overwrite the label data for printing by touching the keys 311 on the graphic keyboard. The dollar sign "$", numerals and punctuation mark "." are added by touching the currency data input area 318, numeric data input area 317, and punctuation data input areas 316, respectively, and selecting the desired characters as described above.

When the user wishes to save the revised label they can enter the save screen as previously described. See FIG. 6e. In this example, since the label name 201 in Section B is the same as a label name included in the list 335 of label names in Section C, the user is presented with the screen shown in FIG. 6f when they touch button 471 of FIG. 6e. Here they are given the option as to whether or not they wish to overwrite the previous label data associated with the file name "Price tag". If the user does not wish to overwrite the label data, they touch area 441 of Section D of the screen in FIG. 6f. If they are happy to overwrite the data, they touch area 442 instead.

Another feature of embodiments of the present invention will now be described with reference to FIGS. 7a to 7j.

Figure 7A:
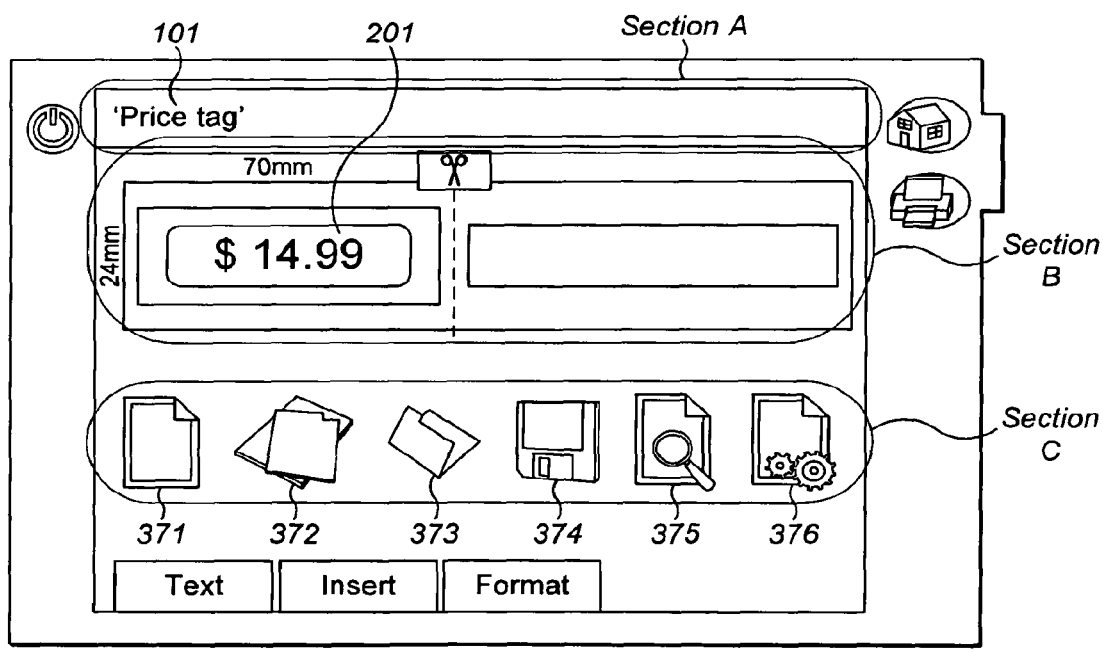
FIGS. 7a to 7j show exemplary input screens in further embodiments of the present invention.

FIG. 7a shows the home screen as previously described. A previously-created representation 201 of label data to be printed onto a tape is shown in Section B. Section A includes an indication 101 of the file name of the file which is now open, with which file the label data is associated. To create a new label, the user touches area 371 of Section C. Similarly to as described above, the area 371 includes information indicative of the function associated with the area 371—in this case a blank page to indicate creating a new label. After touching this area, the user is presented again with the screen shown in FIG. 5b in which Section A includes an indication 101 that the label currently being created does not have an associated file name.

The tabs from Section D of FIG. 5a are shown at the top of Section C in FIG. 5b. The left-most tab, labelled "Text" is highlighted. The other two tabs are selectable, but not currently selected. The user can add graphic symbols to the representation 201 of label data to be printed onto a tape. To do this the user touches the middle tab labelled "Insert". They are then presented with the screen shown in FIG. 7b.

Figure 7B:
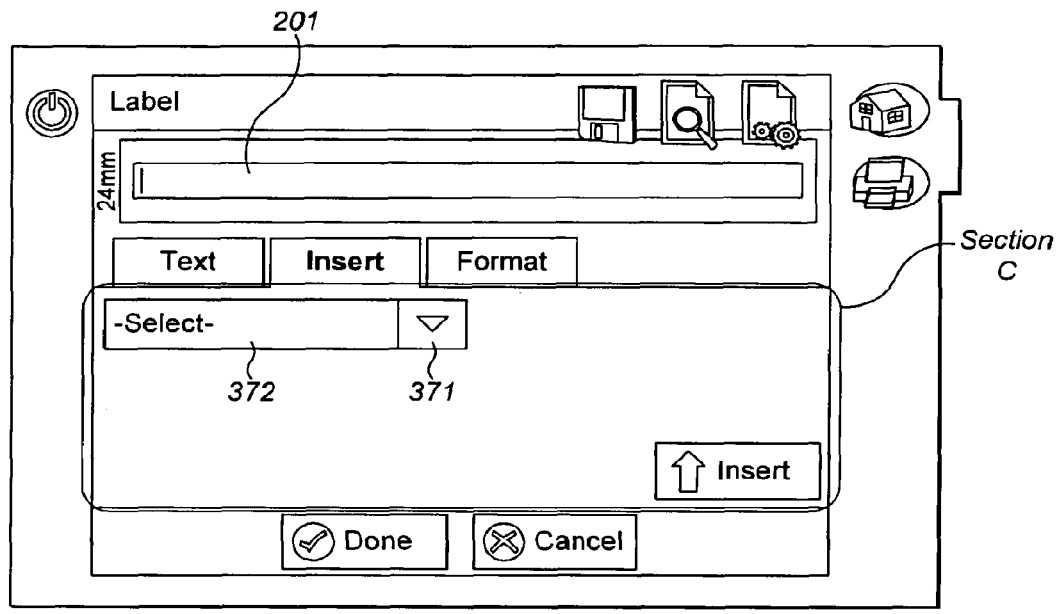
Figure 7C:
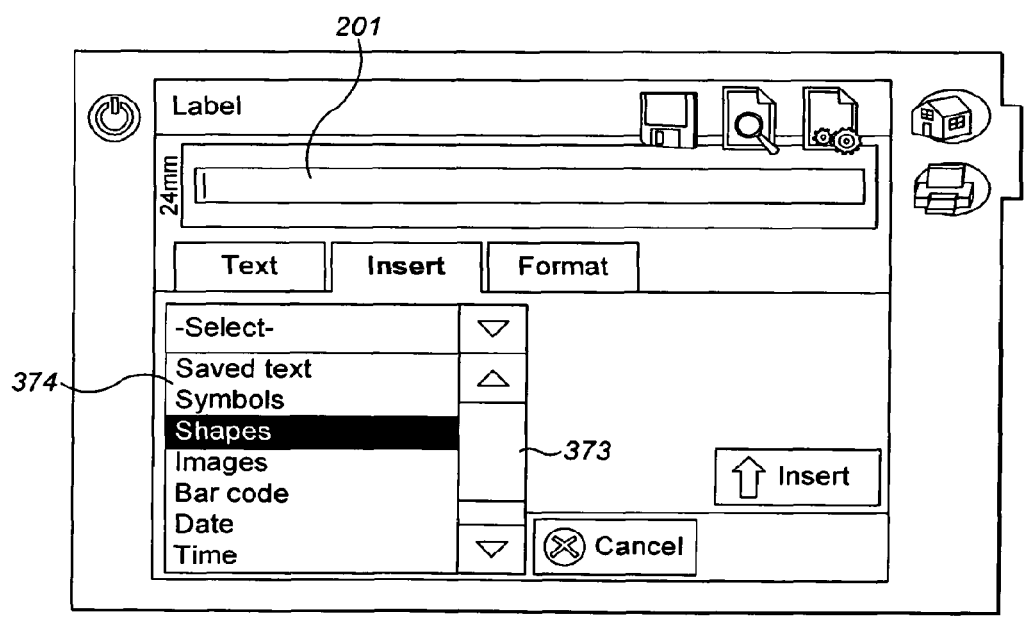
Figure 7D:
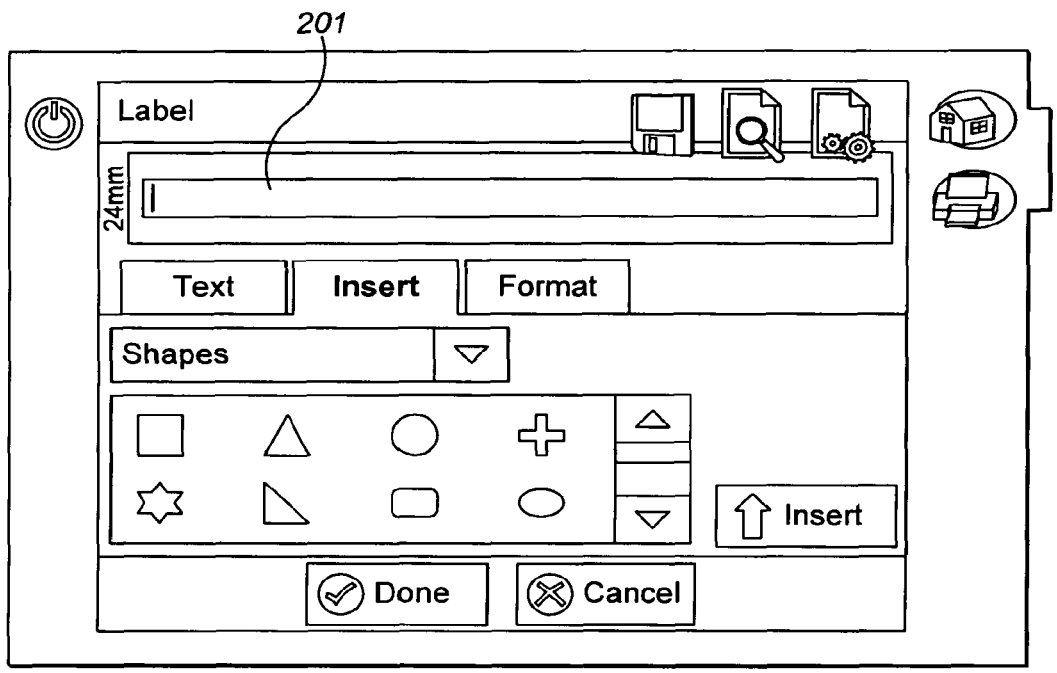
Figure 7E:
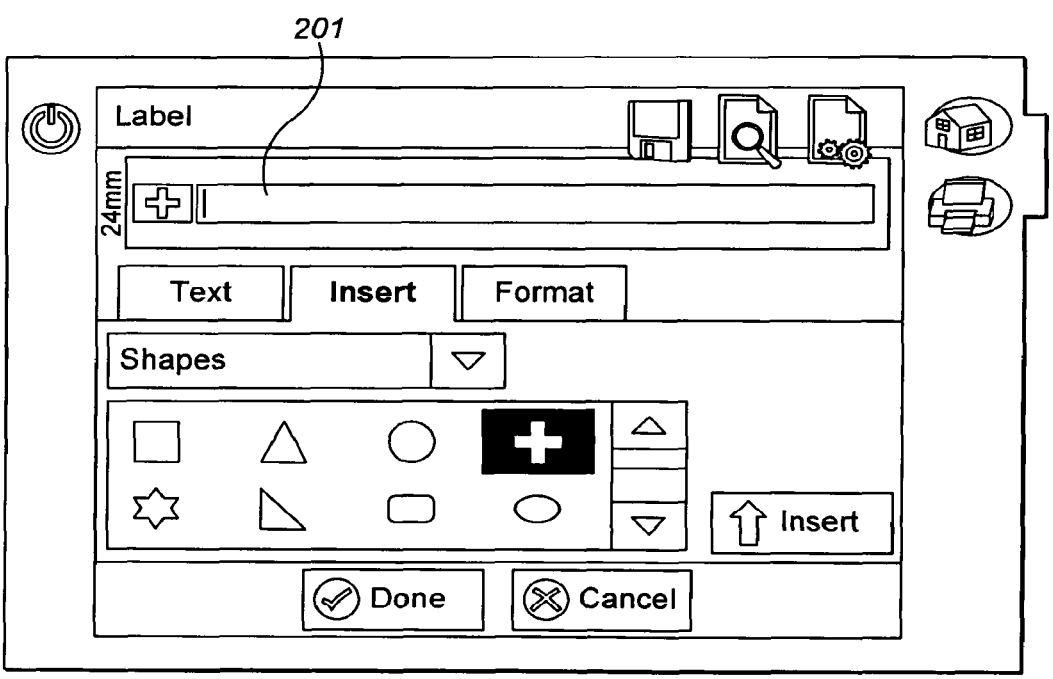
Figure 7F:
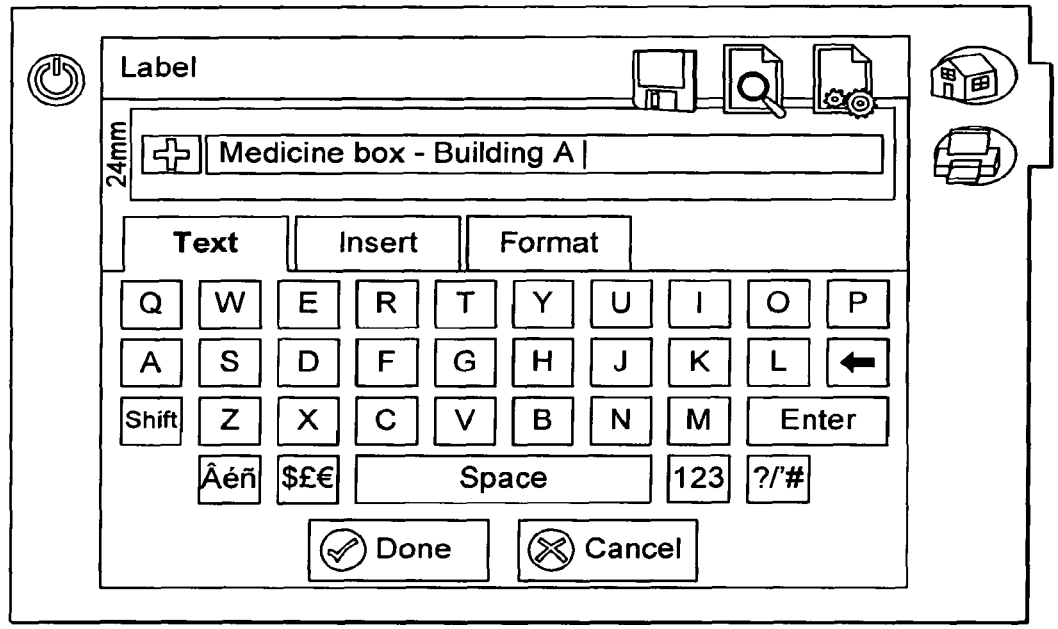
Figure 7G:
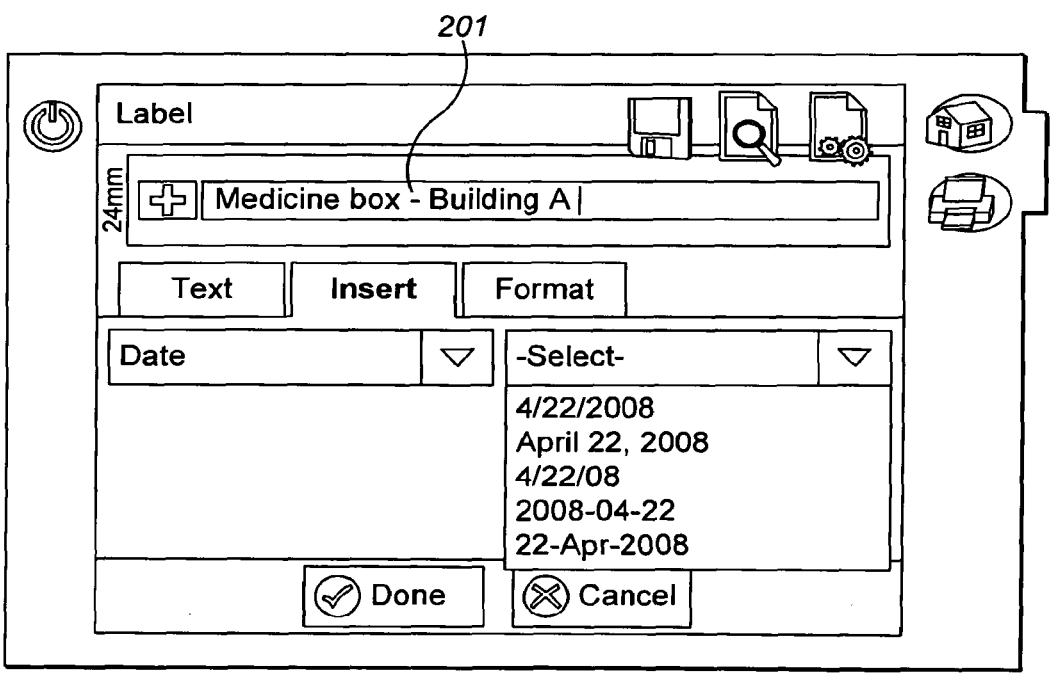

In FIG. 7b, the middle tab, labelled "Insert" is highlighted. The other two tabs are selectable, but not currently selected. The user touches area 371 of Section C and is presented with a list 374 of objects which are addable to the label data representation 201, as shown in FIG. 7c. The user selects one of the items on the list by touching the screen at a part which overlays the desired selection. The user can scroll up and down the list by dragging the slider 373 in the manner previously described. After selecting "shapes" from this list 374, the user is presented with another list from which to choose, as shown in FIG. 7d. This list shows a series of predetermined graphic symbols which are selectable to be added to the label data representation 201, and thus the label data from which the resultant label will be made. The user selects one of the symbols by touching a part of the screen overlaying the desired selection, then touches the "Insert" key shown in FIG. 7e, and then a representation of the chosen symbol is then added to the representation 201 of the label data to be printed, as shown in FIG. 7e. In alternative embodiments the "shapes" option may be a sub-set of the "symbols" option in list 374 of FIG. 7c.

The user can then select the tab labelled "Text" and add text to the label data representation 201 in the manner described above to arrive at the situation shown in FIG. 7f. Thus, it is illustrated that the representation 201 of the label data for printing onto a medium such as a tape can include text, symbols and images.

The user can add to the representation 201 data of a predetermined format. To do this, the user must again touch the tab labelled "Insert", and scroll down the presented list to select a type of such data of a predetermined format. If the user, for example, wishes to insert a date object into the representation 201, then the user touches a part of the screen overlying the desired selection as previously described. They are then presented with the screen shown in FIG. 7q. The data object has several predetermined possible formats from which the user can select, as shown in FIG. 7q. To select one of the possible formats, the user touches a part of the screen associated with the desired selection. In this embodiment the part is overlying the desired selection. The selected object is then inserted into the representation 201 of label data to be printed in Section B—see FIG. 7h.

Figure 7H:
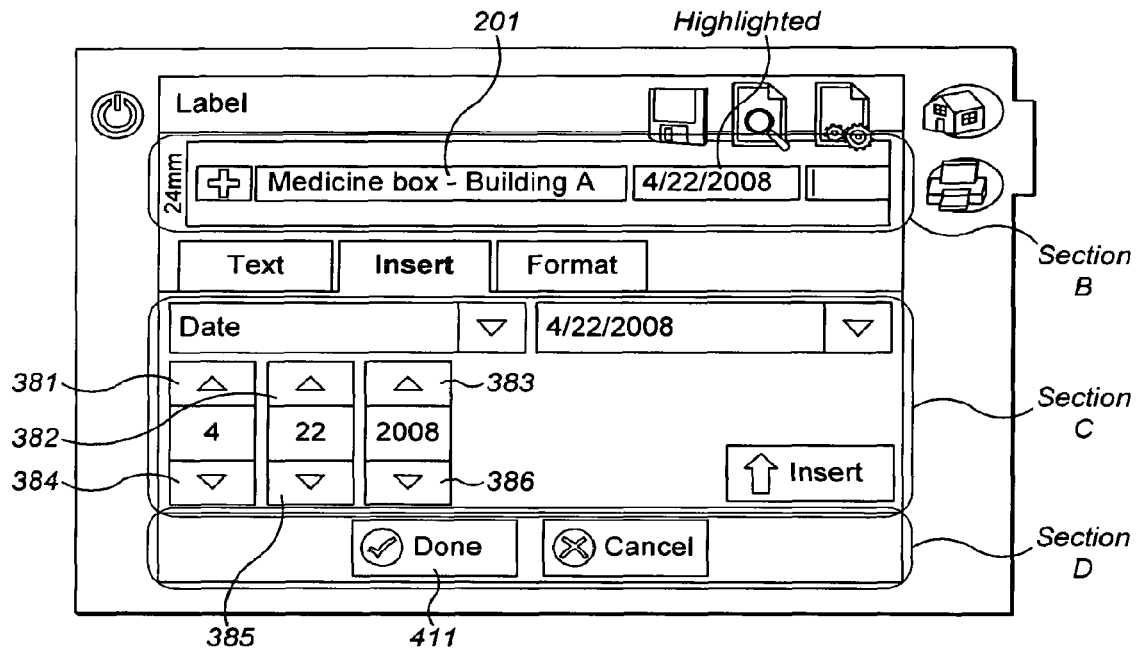

The user can select an object newly-added to the representation 201 by touching a part of the screen in Section B associated with the object. In this embodiment the part of the screen to be touched is overlying the object. The object is then highlighted, as shown in FIG. 7h. In other words, touching part of the screen associated with part of the representation of the label data changes an attribute associated with the label data. In this case that attribute is the highlighted-nature of the date in the label data.

With the part of the label data thus selected, the user can alter the value of the figures in the date by touching areas 381 to 386 in Section C of the screen in FIG. 7h. In other words, touching part of the screen which is different to the part of the screen where a portion of a representation of label data is displayed changes an attribute associated with the label data. In this case that attribute is the value of a figure in the date included in the label data. Although in the present example the date is highlighted, the user has decided not to touch any of the areas 381 to 386. The user can return to the home screen shown in FIG. 7i by touching area 411 of Section D, as previously described. In some embodiments, touching and then maintaining contact with one of the areas 301 to 306 scrolls through the list of available date values. In some embodiments, the longer a user maintains contact in this way, the faster the scrolling happens. In some embodiments this is a feature present for each scroll.

Figure 7I:
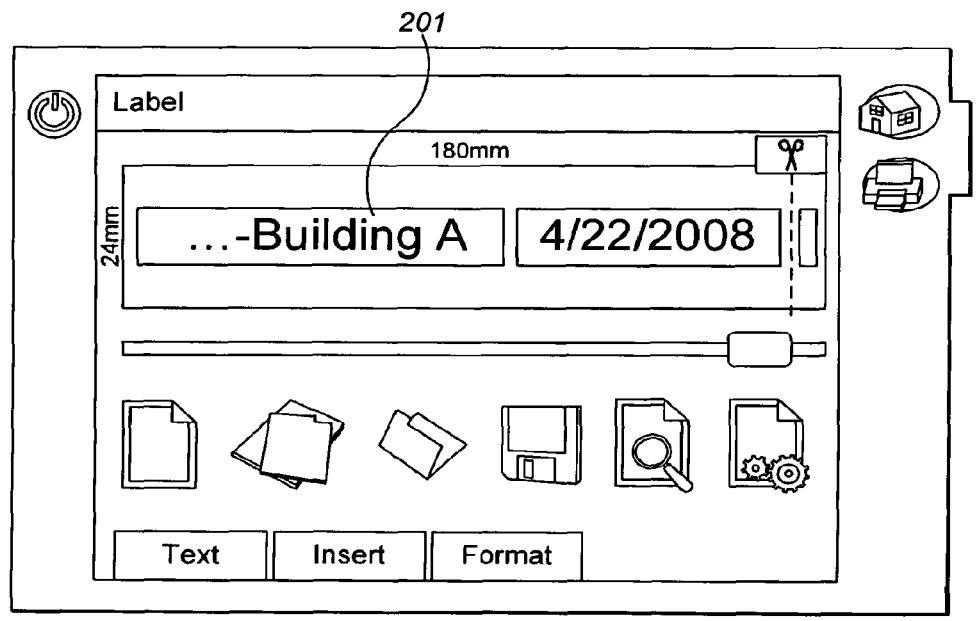
Figure 7J:
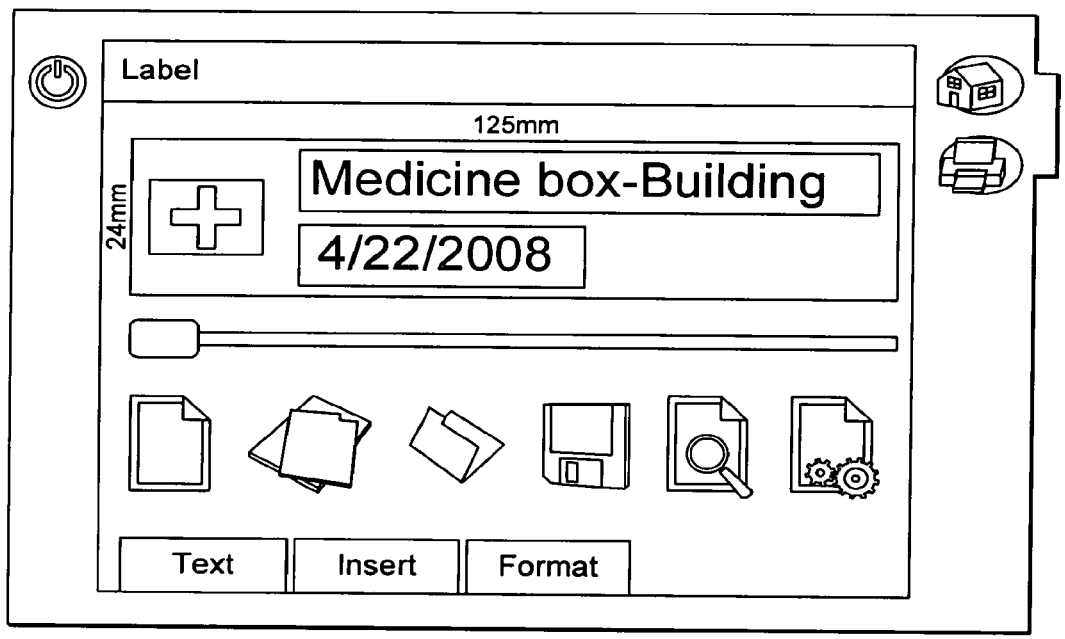

Once at the home screen, the user is able to change the relative location of parts of the representation 201 of the label data, and thus the relative location of elements of a label to be printed. In FIG. 7i, the date in the representation 201 is located at a first position within Section B. The date is an example of a data field. Other items of text, symbols or images may also be considered data fields. The user can select the date data field by touching part of the screen overlying the date data field. When the user subsequently touches a first part of the display and maintains contact with the display until releasing contact with the display at a second part of the display, i.e. the user drags or strokes their finger or stylus or other input device over the screen surface, the MCU 600 controls the display to display a representation of the date data field at a second position within Section B. The result is a display shown in FIG. 7j. In this embodiment, the "first part" of the display in this case is a point which overlies the displayed date data field when the date data field is in its first position. In other embodiments it is conceivable that the data field may be so movable when a user strokes the display between two different parts, and in some embodiments neither of which may overlie the displayed data field.

The text data field containing the wording "Medicine box—Building A" can be considered a further data field. In FIG. 7i it is shown at a third position. Once the date data field has been relocated, the text data field is positioned at a fourth position, in order to accommodate both the data fields within the width of the tape represented in Section B.

Another feature of embodiments of the present invention will now be described with reference to FIGS. 5a and 8a to 8e.

FIG. 5a shows the home screen, as previously described. To create a label according to a predetermined template, the user may touch "template-creation" area 302 in Section C. The user is then presented with the screen shown in FIG. 8a, in the manner previously described. A predetermined template comprises a set of attribute or formatting data which is applicable to label data subsequently applied to the template.

In alternative embodiments, the template-creation touch area may be included on the screen displayed after the user has touched "new" area 301 in Section C of FIG. 5a. In some embodiments a different icon may be used for the template-creation touch area, such as an icon including the word "template".

Figure 8A:
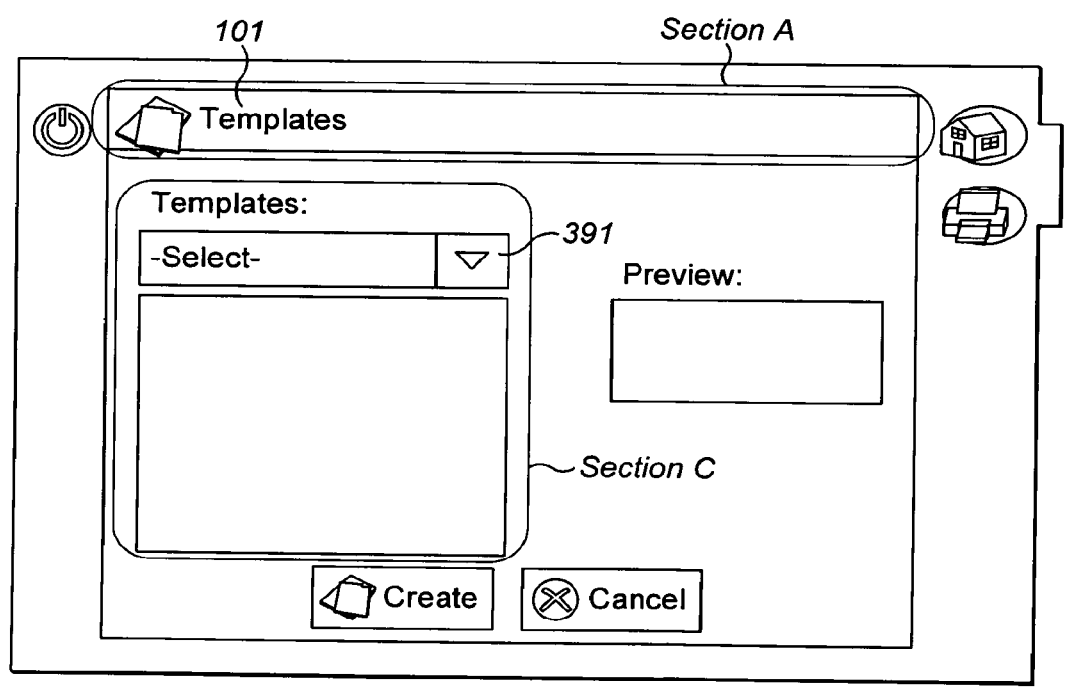
FIGS. 8a to 8e show exemplary input screens in embodiments of the present invention.
Figure 8B:
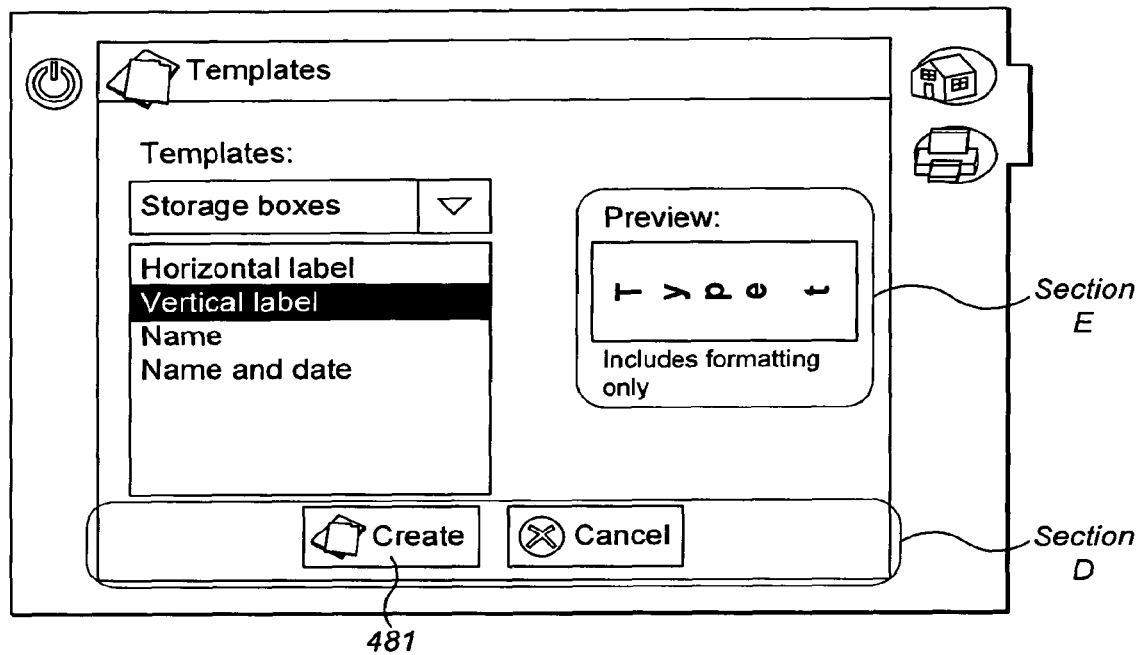

The user may select an item from a drop down list which appears after the user touches area 391 in Section C of the screen shown in FIG. 8a. Section A of the screen includes an indication 101 that the displayed screen relates to templates. In other words, the printer is in a mode in which labels from templates can be created. After the user selects an item from the list, in the manner previously described, they may be presented with a sub-list from which to choose a sub-template style of template. See FIG. 8b. When the user selects a template from the sub-list, a preview of the label formatting attributes associated with the template may be displayed in Section E of FIG. 8b. The user is thus given an indication of the format associated with the template before creating a label adhering to that format. The user chooses the template by touching area 481 of Section D of FIG. 8b.

Figure 8C:
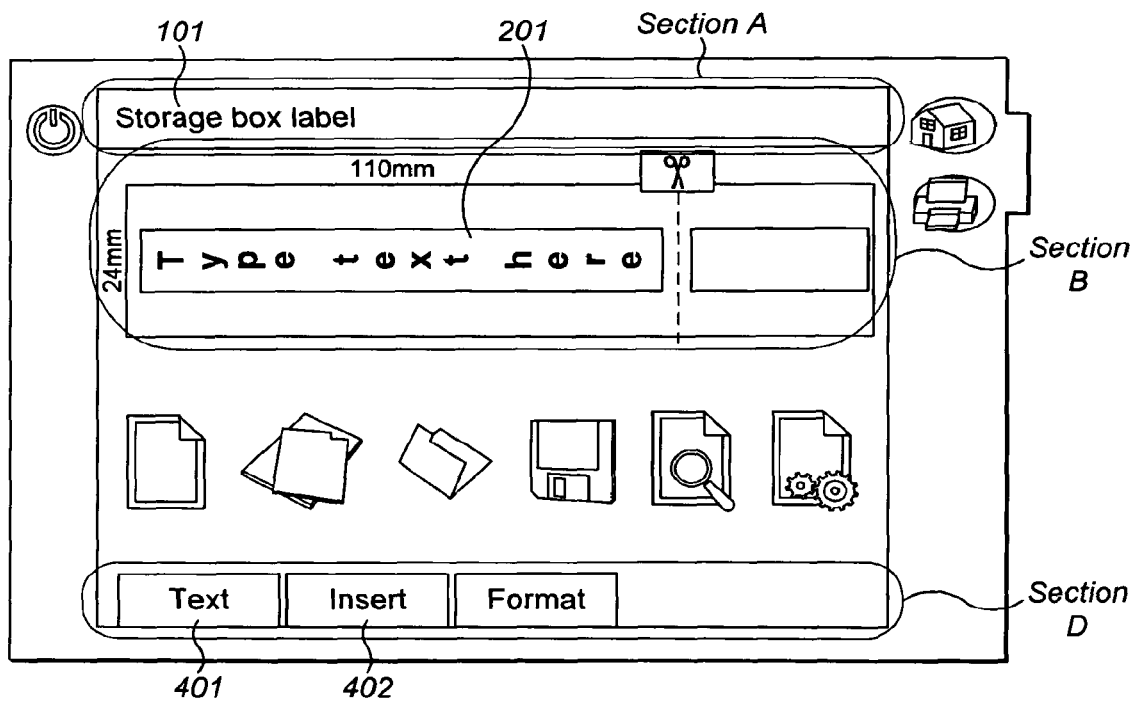
Figure 8D:
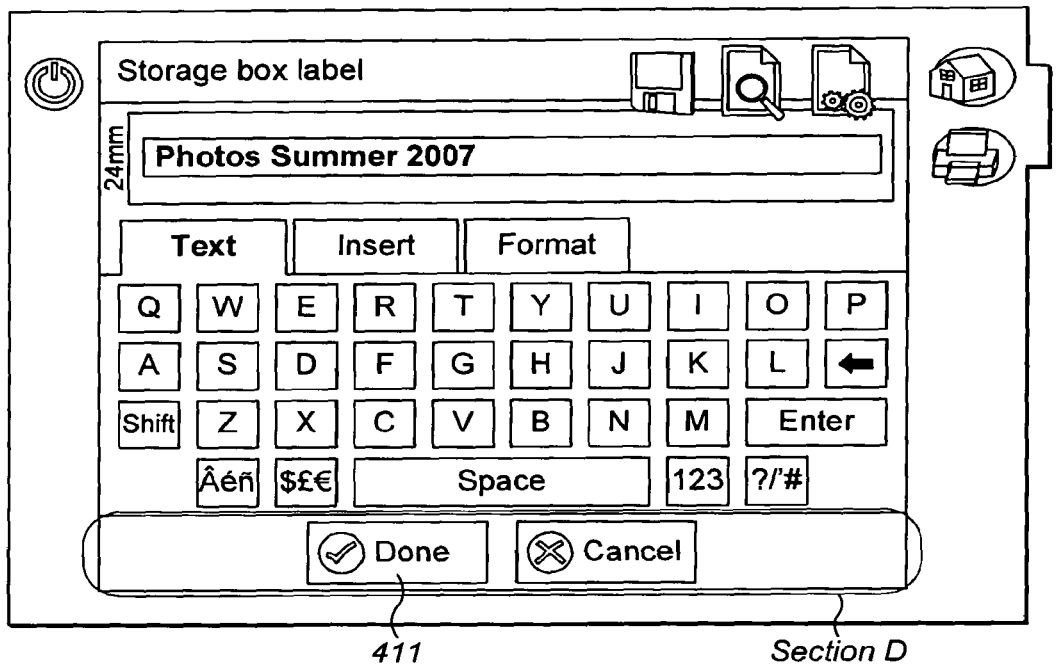

The user is then presented with the home screen shown in FIG. 8c, which includes in Section B a representation 201 of the label format data that will be applied to label data subsequently added to the representation 201. Section A includes an indication 101 of the type of template selected. The user may add an object or data field to the label data and its representation 201 by touching area 402 of Section D of FIG. 8c. The user may add text to the label data and its representation 201 by touching area 401 of Section D of FIG. 8c. In this latter case, the user may be presented with a keyboard, as shown in FIG. 8d, via which the user can type text as previously described. In this example the user types "Photos Summer 2007". The user may then touch the area 411 labelled "Done" in FIG. 8d to arrive at the home screen shown in FIG. 8e.

Figure 8E:
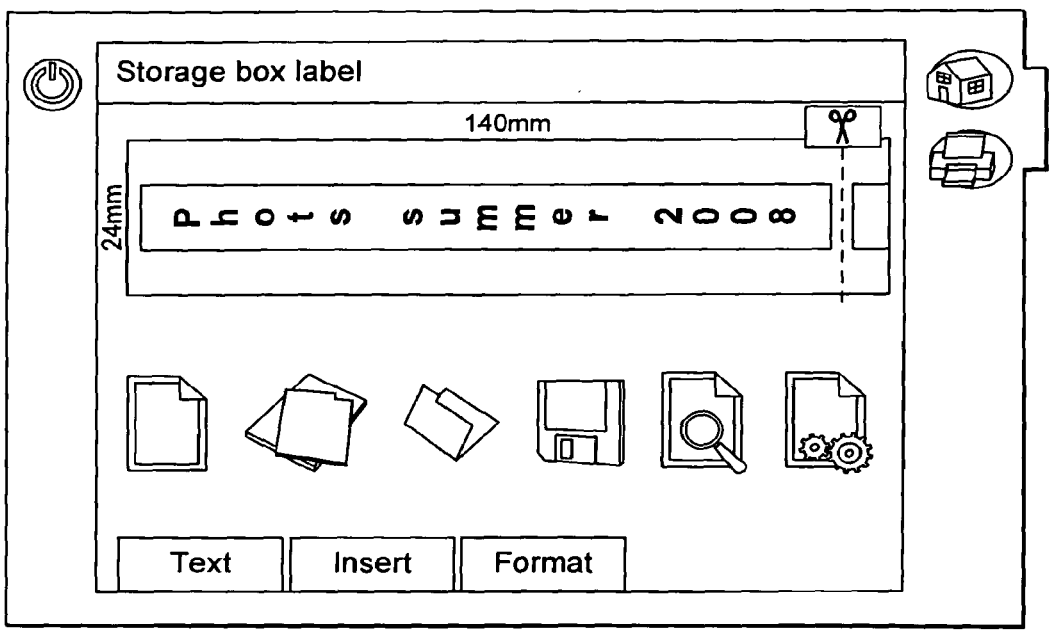

In FIG. 8e, Section B includes a representation 201 of the label data to be printed onto a tape. The representation 201 includes the label data entered by the user via the keyboard and the label data is formatted according to the template previously selected by the user. The user can then save the label to the ROM 602 or flash or user memory, in a manner as previously described.

Alternatively or additionally, if the user has already entered text, the processor will display the label in accordance with the selected template. The user can scroll down the options and the displayed label will alter in dependence on the currently selected template.

In this embodiment, the processor may be arranged to remove some and preferably all of the format information and replace that information with the format information associated with the template.

Another feature of embodiments of the present invention will now be described with reference to FIGS. 5a and 9a to 9f.

FIG. 5a shows the home screen, as previously described. A user may create a series of labels, each of which comprises a number or letter, wherein the number or letter comprised in one label is consecutive to the number or letter comprised in the next label in the series. Each label may also comprise data that is included in each of the labels in the series. Complex examples involving more than one number or letter are also supported. An example of creating such a series of labels will now be described.

Figure 9A:
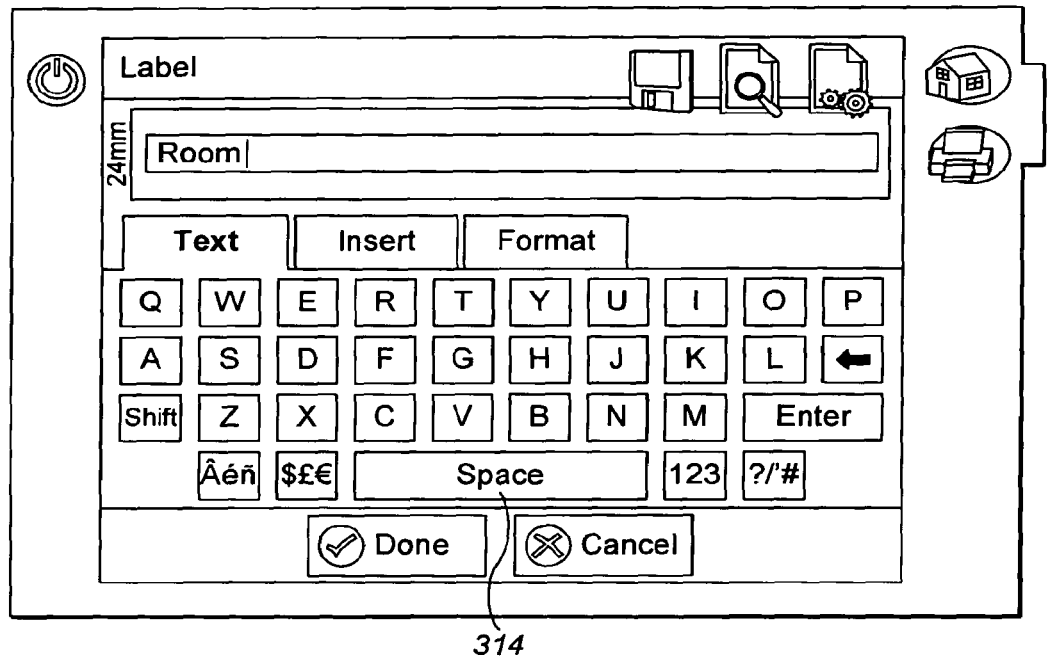
FIGS. 9a to 9f show exemplary input screens in embodiments of the present invention.

The user may touch area 301 in Section C of FIG. 5a to start making a new label. The user is presented with a keyboard as previously described, via which the user can add label data to a label. In this example the user enters text which spells "Room" and then enters a space after the text by touching space key 314 on the keyboard, as previously described. The resultant screen is shown in FIG. 9a. As for when the user decided to add a date object, or date data field, to the label described above with reference to FIGS. 7a to 7j, the user touches the tab labelled "Insert" in Section C of FIG. 9a. The screen shown in FIG. 9b is displayed.

Figure 9B:
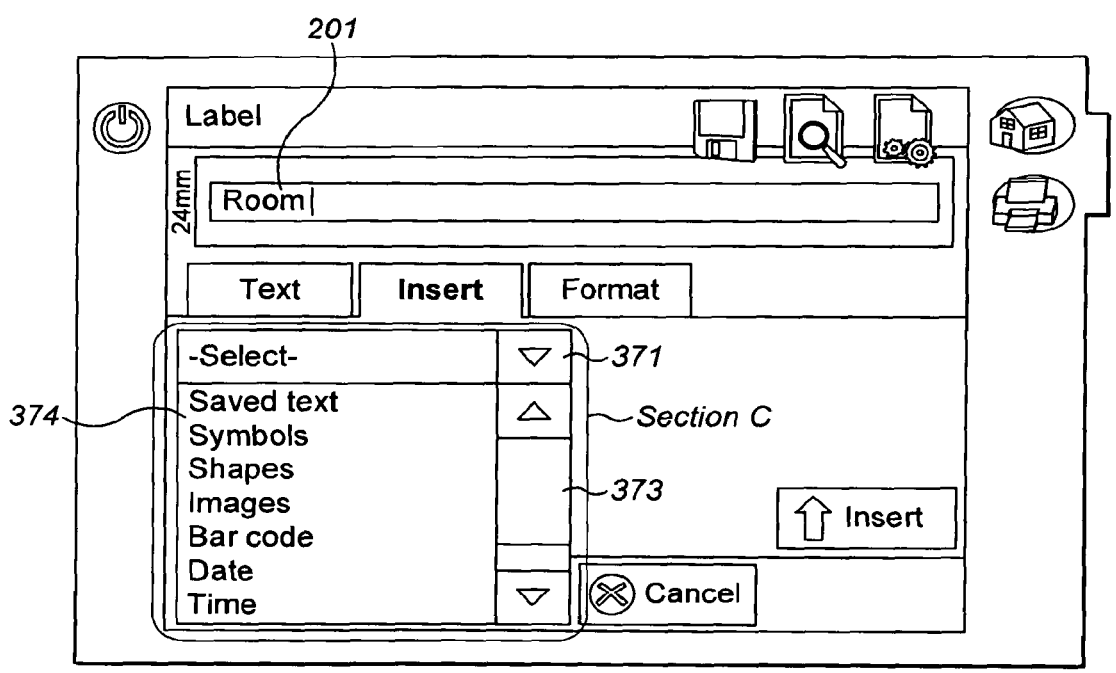
Figure 9C:
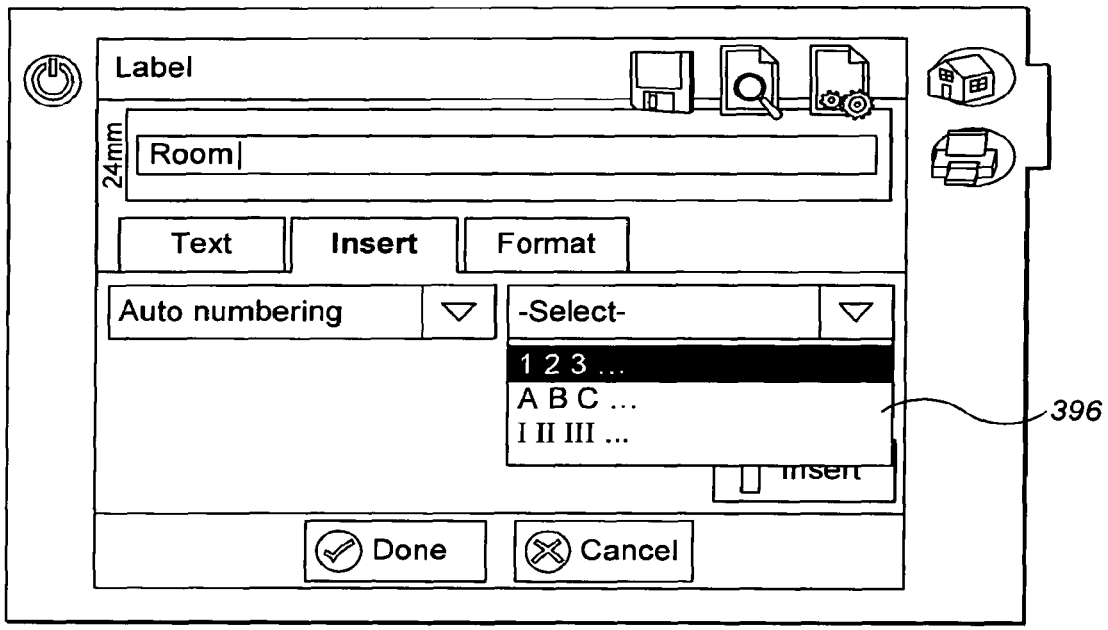

The user touches area 371 of Section C and is presented with a list 374 of objects which are addable to the label data representation 201, as shown in FIG. 9b. The user selects one of the items on the list by touching the screen at a part which overlays the desired selection. The user can scroll up and down the list by dragging the slider 373 in the manner previously described. After selecting "Auto numbering" from this list 374, the user is presented with another list 396 from which to choose, as shown in FIG. 9c. List 396 includes plural data entries, each of which is associated with a particular format of numbering, i.e. a particular format of label data. The user in this example may select "1 2 3" from the list 396, and is then presented with the display shown in FIG. 9d. By touching the relevant areas of the display in FIG. 9d, the user is able to configure the format of the objects to be added to the series of labels. The user may select a series beginning with the number "001" and continuing thus: "002", "003", and so on. After touching area 411 in Section D labelled "Done", the user is presented with the home screen as shown in FIG. 9e.

Figure 9D:
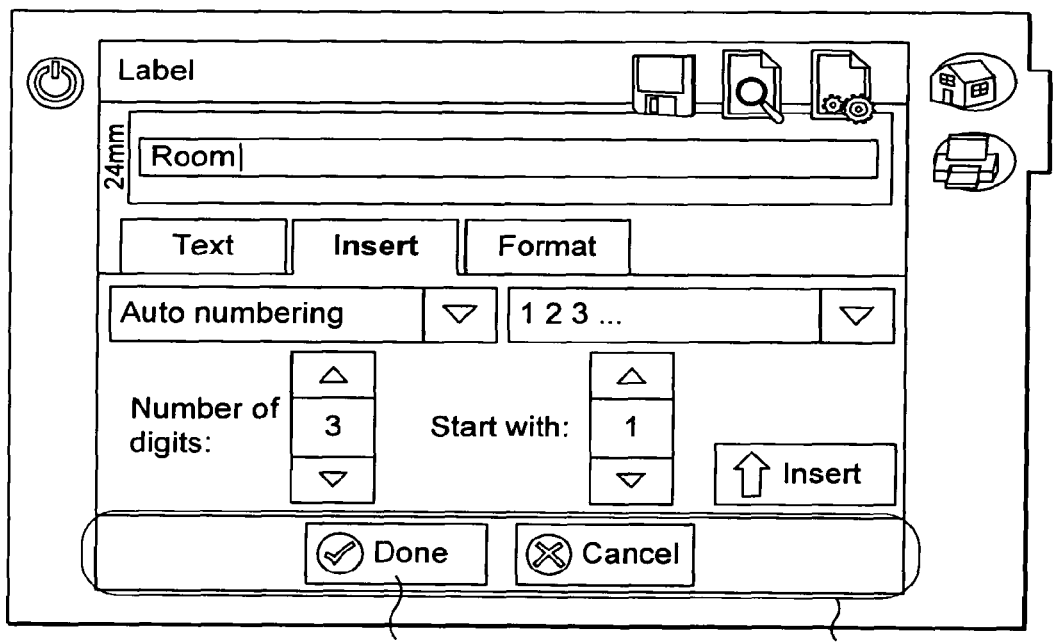
Figure 9E:
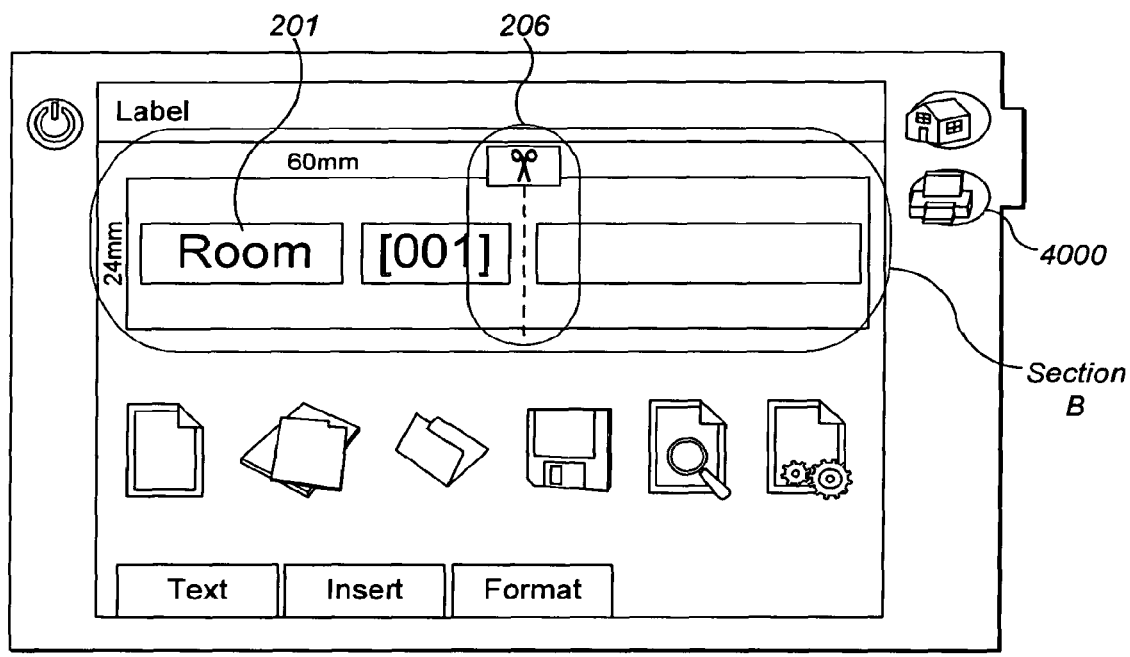
Figure 9F:
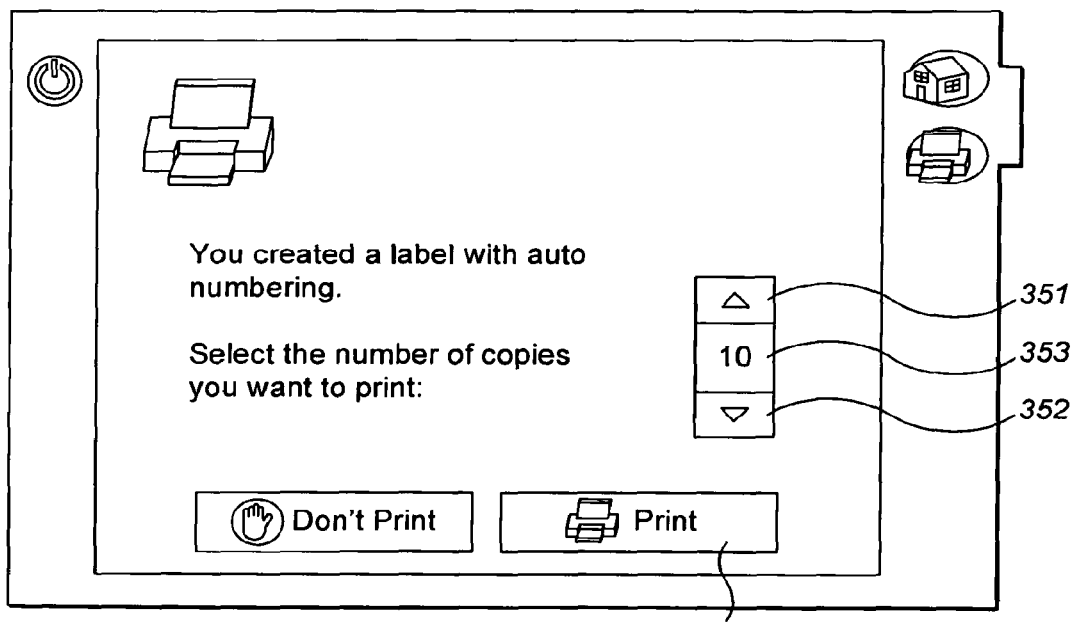

FIG. 9e shows that the home screen includes a representation 201 of the label data to be printed on a first label and subsequent labels. The representation 201 includes two data fields, the first being a text data field which will be included in label data for the first label and in label data for every subsequent label in the series, and the second being a text data field that will vary in the label data for each of the respective labels of the series.

To print the series of labels, the user presses the print button 4000, as described above. Due to the data field object the user selected, namely the "Auto numbering" template, after pressing the print button 4000 the user is presented with the screen shown in FIG. 9f. The user is provided with the means for specifying the number of labels to be included in the series, in this example by way of input areas 351 and 352 which can respectively be touched to increment and decrement the value shown in box 353. The value represents the number of labels for inclusion in the series of printed labels. In this example the user sets the value in box 353 to "10" and touches area 492.

In some embodiments, touching and then maintaining contact with one of the areas 351 and 352 scrolls through the list of available values. In some embodiments, the longer a user maintains contact in this way, the faster the scrolling happens.

After touching area 492, a signal is sent from the touchscreen to the MCU 600 and the MCU 600 drives a printing mechanism of the printer, to print the label data onto a tape as ten consecutive labels. The first label includes the set text "Room" and the first of the auto-numbers in the series, i.e. "001", the second label includes the set text "Room" and the second of the auto-numbers in the series, i.e. "002", and so on. After the label data has been applied to each of the labels in turn, the tape is cut at a position corresponding to the position of an indicator 206 shown in section B of FIG. 9e. Thus, ten individual consecutively-numbered labels are quickly and simply manufactured.

In other embodiments, the means for specifying the number of labels to be included in the series is included in the screen shown in FIG. 9d. Thus, the screen of FIG. 9d can include input means for selecting the number or letter to be included in the first label of the series, and means for selecting the number or letter to be included in the last label of the series.

It is advantageous for the selectable input areas provided in some or each of the above-described screens to be sufficiently large enough that a user may select an input area using one of their fingers.

Figure 10:
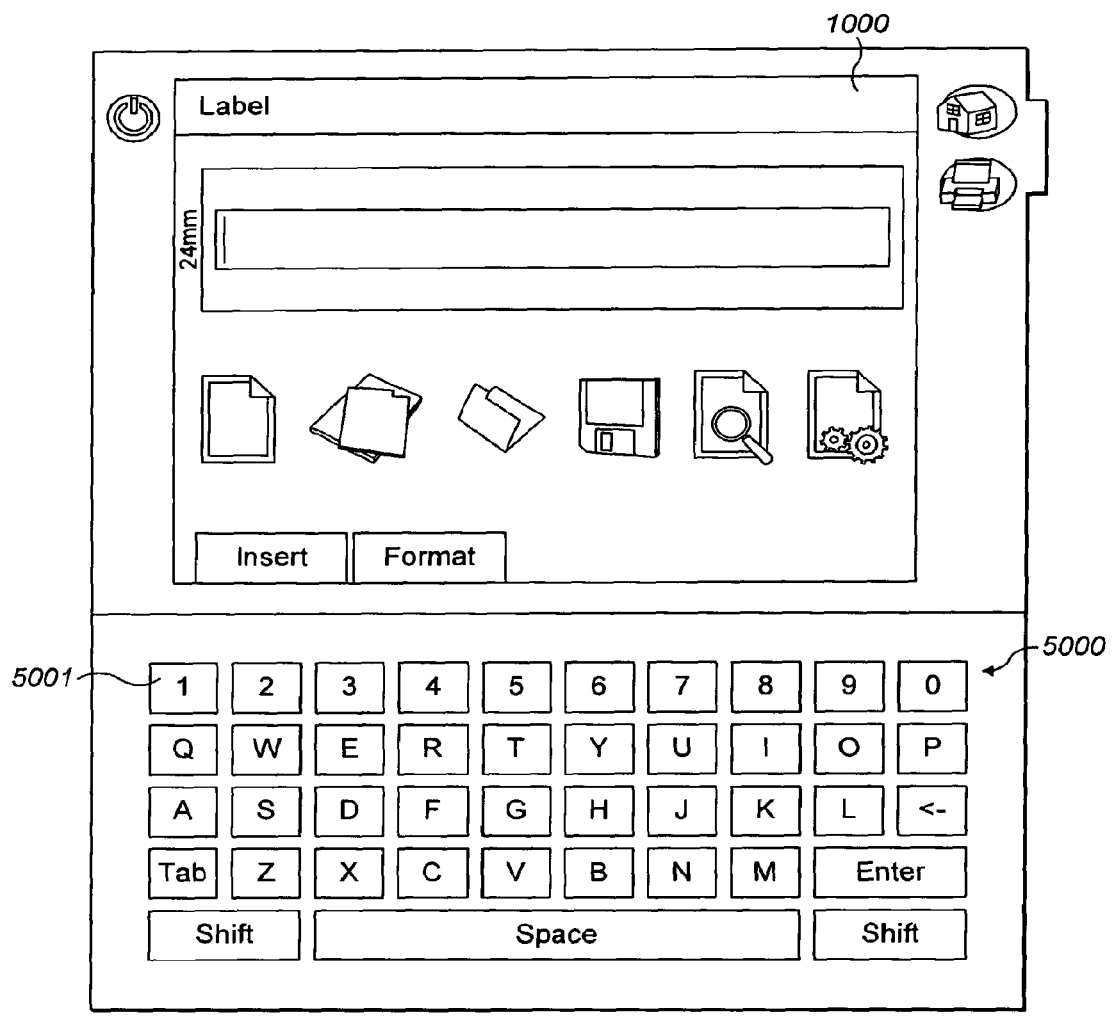
FIG. 10 shows another embodiment of the present invention.

In alternative embodiments of the label printer of the present invention, the printer may include a touchscreen but also have a hardware keyboard. FIG. 10 shows such an embodiment.

When a key 5001 of the hardware keyboard 5000 is pressed by a user, a signal representative of the key pressed is sent to the MCU 600. The MCU 600 is thus able to determine which of the keys was pressed, and to act accordingly.

In FIG. 10, the touchscreen 1000 is displaying the home screen described above with reference to FIG. 5a. The home screen in FIG. 10a differs from that shown in FIG. 5a in that no tab is provided in Section D labelled "Text". This is because the touchscreen 1000 of the label printer shown in FIG. 10 is not configured to display a graphical keyboard via which a user may touch input areas to enter letters and numbers. Instead, a hardware keyboard 5000 is provided for this purpose. Indeed, in the embodiment shown in FIG. 10, none of the screens shown to the user (corresponding to any of the screens shown in FIGS. 5a to 9f) includes a tab labelled "Text".

All of the operational features described above with reference to FIGS. 5a to 9e using the touchscreen may be carried out using the touchscreen of the device shown in FIG. 10, except that the input of any letters and numbers is actioned by the user pressing respective ones of the hardware keys 5001 of the hardware keyboard 5000. In other embodiments which include a hardware keyboard, one or more of a space key, backspace key, enter key, and carriage return key (similar to those shown in FIG. 5b) may be included in the hardware keyboard instead of, or in addition to, the touchscreen. Other keys previously described as being represented on a touchscreen may also or instead by provided as part of the hardware keyboard.

Other alternative embodiments of the present invention may include such a hardware keyboard 5000 as that shown in FIG. 10 and also include a touchscreen 1000 that is configured to display a graphical keyboard via which a user may touch input areas to enter letters and numbers, in the manner described above with reference to FIGS. 5a to 9e. Such other alternative embodiments may include the feature that the user can select from a variety of graphical keyboards, as described above with reference to FIG. 5a.

When a user is using a template to create a label, such as in the embodiment described with reference to FIGS. 8a to 8e, but by using the hardware keyboard 5000 of the embodiment of FIG. 10 rather than a graphical keyboard on the touchscreen, it is preferable that the example text should disappear automatically when the user starts to type on the hardware keyboard 5000. In other words, for example the wording "type text here" shown in FIG. 8c would immediately be replaced with the text entered via the hardware keyboard 5000.

In one embodiment of the invention the user creates label data by a combined usage of the hardware keyboard and the input areas on the touchscreen. For some label data, it is time consuming to create the label data by the touchscreen only or by the keyboard only. However, if the same label data is created by an input method using a combination of the touchscreen and the hardware keyboard, the user can create the label data in a few easy steps, since text and character entry can be made via the hardware keyboard, while a screen can be presented to the user on the touchscreen that includes formatting, template, or special character options.

An example is the creation of an accented character. Creating accented characters only via a hardware keyboard requires a large number of steps. The user has to press first a hardware key to select the accented characters mode and subsequently he has to press several navigation buttons to come to the accented character he wants to input. Pressing the enter button enters the accented character.

If a combination of the hardware keyboard and touchscreen is used the number of steps required to input an accented character can be reduced significantly. The user presses a hardware key for accented characters (not shown). The MCU subsequently displays a screen including plural input areas, each of which is associated with a different accented character, on the touchscreen and the user can immediately select the desired accented character by touching the area on the touchscreen which corresponds with the graphics of the desired accented character. Other examples are the input of symbols, the selection of a format or a template, opening a stored label, etc. Thus, there is no need to keep switching between a graphical keyboard layout and a screen showing e.g. formatting options on the touchscreen, since the user can access both a hardware keyboard and a screen simultaneously.

As the user is operating a hardware keyboard normally with his fingers, it is advantageous to use a touchscreen with input areas which are selectable with his fingers too.

It is to be noted that the values included in any of the lists described above may in some embodiments be sorted into alphabetical or numerical order to allow a user to find a desired value easily. Moreover, in some embodiments it is possible for the user to select a list by touching a part of the scroll bar or the list itself. Any cursor on the screen may then disappear. By subsequently entering a character (e.g. a letter of the alphabet or a number) on a hardware keyboard (or possibly on a graphical keyboard shown on the screen), the list is shifted to the position where the first character in a value in the list starts with the character entered. The user can then select an item in the list by touching a portion of the display overlying that item. This is a further example of how embodiments of the present invention decrease the effort required to input label data.

In embodiments of the present invention, when a user touches a point within a portion of the touchscreen at which a representation of label data is provided to the user, the MCU initiates a label data input mode and displays a blinking cursor at the point on the screen. When the user subsequently presses a hardware key on the hardware keyboard, the MCU controls the touchscreen to display an item of data associated with the pressed hardware key at the point within the portion. Thus, the cursor acts as an indicator that a user can enter label data for inclusion in the representation, or as a prompt to the user to enter label data. Such a mechanism is not limited to only the scenario in which data is to be added to the representation of label data to be printed. Indeed, a similar mechanism may be used whenever a user is permitted to enter data via the hardware keyboard for display at a point on the screen.

It is advantageous for the label printer to be portable and/or capable of being held in the hand of an operative, i.e. is hand held. The label printer may be powered by one or more batteries or by a mains source of energy.

Embodiments of the invention may be used with continuous tape or die cut labels. Die cut labels are provided on a continuous backing layer but are discrete, pre-cut labels. The tape or die cut labels may be provided in a cassette or simply on a roll.

In some embodiments, those screens which display options for the user to select, these may be arranged to show first or more prominently the options which have previously been selected. The most frequently selected options may be shown first or more prominently. This may be done in some embodiments which have menus for options, e.g. character fonts, etc.

In some embodiments, the software will determine which screens or screens are used more frequently by the user and may change the order in which screens are presented to a user. In other words, the hierarchy of the screens is dependent on how frequently a particular screen is used. In the alternative or additionally, the selection area for a frequently used screen may be made more prominent, moved to a higher level screen, and/or moved within a screen to a different position.

It should be appreciated that by selecting a particular language or country option one or more of the following may be changed: keyboard layout; language of text; hierarchy of screens; displayed options in a screen; position of options in a screen; and available options for a user.

The skilled person would appreciate that the home button 3000 discussed above may comprise a hardware button (e.g. a hardware key), or may comprise a button displayed on the touchscreen display as a selectable input area of the display. As discussed above, in some embodiments a user can press home button 3000 to cause the home screen, such as that shown in FIG. 5*a*, to be displayed when any screen is displayed. In other embodiments, the home button 3000 is not so operable when any screen is displayed, but is only operable in this manner when one of some of the available displayable screens is displayed. In other words, in some embodiments the home button 3000 is not operable to cause the home screen to be displayed when a certain screen is displayed.

In the above-described embodiments, the home screen comprises each of: an area selectable by the user to start making a new label; an area selectable by the user to view an open file screen, via which open file screen the user is able to select a label file to open in order to recall saved data from memory; an area selectable by the user to edit label data shown on the home screen; an area selectable by the user when they want to save label data to memory; and an area selectable by the user to initiate altering device settings. In other embodiments, the home screen may comprise only one or some of these selectable areas.

As discussed above, the home screen is displayed when the label printer is switched on. Thus, in some embodiments, the home screen is the first screen displayed when the label printer is switched on. In other embodiments, a flash screen or other screen may temporarily be displayed before the home screen is displayed, when the label printer is switched on.

The foregoing merely illustrates the principles of the invention. Various modifications and alterations to the described embodiments will be apparent to those skilled in the art in view of the teachings herein. It will thus be appreciated that those skilled in the art will be able to devise numerous techniques which, although not explicitly described herein, embody the principles of the invention and are thus within scope of the invention, as defined by the claims.

The invention claimed is:

1. A label printer having:
   memory configured to store data defining plural different graphical control panel layouts, each of said layouts comprising an arrangement of input areas of a respective graphical control panel,
   a display comprising a touchscreen,
   a section of the touchscreen being operable for selecting one of said graphical control panel layouts, and
   the touchscreen being configured to display a graphical control panel with input areas arranged on the display in accordance with the selected graphical control panel layout,
   wherein one of the layouts comprises an arrangement of data layout input areas that are operable to perform respective formatting functions to text comprised in label data to be printed onto a medium,
   wherein the section of the touchscreen comprises plural areas in the form of selectable tabs, each of which tabs is associated with one of said graphical control panel layouts, and the touchscreen is configured to display the graphical control panel layout associated with one of the tabs, when the user touches that tab, and
   wherein the respective formatting functions comprise at least one of the following: emboldening the text, making the text italic, changing the size of characters of the text, and applying a font to the text.

2. A label printer as claimed in claim 1, wherein:
   the touchscreen is configured to display a representation of the label data to be printed onto a medium, and
   the label printer is arranged such that, when a part of the display at which one of the data layout input areas is displayed is touched by a user, an attribute of the representation of the label data to be printed onto the medium is changed.

3. A label printer as claimed in claim 1, wherein at least one of the layouts comprises an arrangement of input areas corresponding to respective different letters of the alphabet.

4. A label printer as claimed in claim 1, wherein at least one of the layouts comprises an arrangement of input areas corresponding to accented letters of the alphabet, punctuation marks, currency symbols, numbers, or graphic symbols.

5. A label printer as claimed in claim 1, wherein:
   at least one of the layouts comprises a data field input area, and
   the label printer is configured such that, when a part of the display at which the data field input area is displayed is touched by a user, a data field to which text or images are addable to create label data for printing onto a medium is displayed on the display.

6. A label printer as claimed in claim 1, wherein the touchscreen is configured to display a representation of label data to be printed onto the medium as a first label and label data to be printed onto the medium as a second label.

7. A label printer as claimed in claim 1, wherein the touchscreen is configured to display a representation of a position at which the medium is to be cut by cutting means of the label printer.

8. A label printer as claimed in claim 1, wherein the touchscreen is configured to display the representation of label data adjacent to the arrangement of input areas.

9. A method, comprising:
   storing data defining plural different graphical control panel layouts, each of said layouts comprising an arrangement of input areas of a respective graphical control panel,
   selecting one of said graphical control panel layouts on a section of a touchscreen display, and
   displaying on the touchscreen display a graphical control panel with input areas arranged on the display in accordance with the selected graphical control panel layout,
   wherein one of the layouts comprises an arrangement of data layout input areas that are operable to perform respective formatting functions to text comprised in label data to be printed onto a medium,
   wherein the section of the touchscreen comprises plural areas in the form of selectable tabs, each of which tabs is associated with one of said graphical control panel layouts, and displaying the graphical control panel layout associated with one of the tabs, when the user touches that tab, and
   wherein the respective formatting functions comprise at least one of the following: emboldening the text, making the text italic, changing the size of characters of the text, and applying a font to the text.

10. A method as claimed in claim 9, wherein:
    the touchscreen displays a representation of the label data to be printed onto a medium, and
    when a part of the display at which one of the data layout input areas is displayed is touched by a user, an attribute of the representation of the label data to be printed onto the medium is changed.

11. A method as claimed in claim 9, wherein at least one of the layouts comprises an arrangement of input areas corresponding to respective different letters of the alphabet.

12. A method as claimed in claim 9, wherein at least one of the layouts comprises an arrangement of input areas corresponding to accented letters of the alphabet, punctuation marks, currency symbols, numbers, or graphic symbols.

13. A method as claimed in claim 9, wherein:
at least one of the layouts comprises a data field input area, and
when a part of the display at which the data field input area is displayed is touched by a user, a data field to which text or images are addable to create label data for printing onto a medium is displayed on the display.

14. A computer program embodied on a non-transitory computer readable medium, said computer program being configured to control a controller of a label printer to:
store data defining plural different graphical control panel layouts, each of said layouts comprising an arrangement of input areas of a respective graphical control panel, and
in response to selection of one of said graphical control panel layouts on a section of a touchscreen display, display on the touchscreen display a graphical control panel with input areas arranged on the display in accordance with the selected graphical control panel layout,
wherein one of the layouts comprises an arrangement of data layout input areas that are operable to perform respective formatting functions to text comprised in label data to be printed onto a medium,
wherein the section of the touchscreen comprises plural areas in the form of selectable tabs, each of which tabs is associated with one of said graphical control panel layouts, and displaying the graphical control panel layout associated with one of the tabs, when the user touches that tab, and
wherein the respective formatting functions comprise at least one of the following: emboldening the text, making the text italic, changing the size of characters of the text, and applying a font to the text.

15. A label printer as set forth in claim 1, wherein the respective formatting functions comprise at least one of a font function, a style function, an alignment function, and a border selection function.

16. A label printer as set forth in claim 15, wherein the font function comprises a slider bar enabling a user to change a size of the font.

17. A label printer as set forth in claim 16, wherein the slider bar comprises a pointer which can be dragged along the slider bar to change the size of the font.

18. A label printer as set forth in claim 1, wherein the selectable tabs are comprised in a section of the touchscreen below a preview of the label data to be printed onto a medium.

19. A label printer as set forth in claim 1, wherein the label printer is configured to display on the display a preview icon which, when pressed, enables a user to see a preview of what a created label will look like when printed.

20. A label printer as set forth in claim 19, wherein if the text comprised in label data to be printed is longer than the display, the preview scrolls across the display.

21. A label printer as set forth in claim 1, wherein the label printer comprises a standalone label printer.

22. A label printer as set forth in claim 21, wherein the standalone label printer is operable by a user independently of a PC or other computer to create and print a label.

23. A method as set forth in claim 9, wherein the respective formatting functions comprise at least one of a font function, a style function, an alignment function, and a border selection function.

24. A method as set forth in claim 23, wherein the font function comprises a slider bar enabling a user to change a size of the font.

25. A method as set forth in claim 24, wherein the slider bar comprises a pointer which can be dragged along the slider bar to change the size of the font.

26. A method as set forth in claim 9, wherein the selectable tabs are comprised in a section of the touchscreen below a preview of the label data to be printed onto a medium.

27. A method as set forth in claim 9, comprising displaying on the display a preview icon which, when pressed, enables a user to see a preview of what a created label will look like when printed.

28. A method as set forth in claim 27, wherein if the text comprised in label data to be printed is longer than the display, the preview scrolls across the display.

29. A method as set forth in claim 9, wherein the method is carried out on a standalone label printer.

30. A method as set forth in claim 29, wherein the standalone label printer is operable by a user independently of a PC or other computer to create and print a label.

* * * * *